(12) United States Patent
Ishibashi

(10) Patent No.: US 10,401,544 B2
(45) Date of Patent: Sep. 3, 2019

(54) OPTICAL SYSTEM AND OPTICAL APPARATUS INCLUDING THE SAME

(71) Applicant: CANON KABUSHIKI KAISHA, Tokyo (JP)

(72) Inventor: Tomohiko Ishibashi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/209,438

(22) Filed: Jul. 13, 2016

(65) Prior Publication Data

US 2017/0031071 A1  Feb. 2, 2017

(30) Foreign Application Priority Data

Jul. 27, 2015 (JP) ................. 2015-148159

(51) Int. Cl.
| | |
|---|---|
| *G02B 5/08* | (2006.01) |
| *G02B 5/28* | (2006.01) |
| *G02B 13/04* | (2006.01) |
| *G02B 27/00* | (2006.01) |

(52) U.S. Cl.
CPC ........... *G02B 5/283* (2013.01); *G02B 5/0891* (2013.01); *G02B 13/04* (2013.01); *G02B 27/0018* (2013.01)

(58) Field of Classification Search
CPC ...... G02B 13/04; G02B 15/173; G02B 13/18; G02B 27/0025; G02B 13/003; G02B 13/004; G02B 15/161; G02B 15/177; G02B 1/00; G02B 27/0037; G02B 27/0062; G02B 27/4211; G02B 7/008; G02B 9/34

USPC ....... 359/350–361, 795, 680, 686, 689, 739, 359/793, 794, 577, 676, 691, 708, 713, 359/717, 749, 752, 755, 762, 781
See application file for complete search history.

(56) References Cited

U.S. PATENT DOCUMENTS

| | | | | |
|---|---|---|---|---|
| 2008/0239517 A1* | 10/2008 | Mori | ......... | G02B 9/34 359/781 |
| 2009/0128936 A1* | 5/2009 | Shibuya | ......... | G02B 5/223 359/885 |
| 2013/0135514 A1* | 5/2013 | Maetaki | ......... | G02B 9/04 359/793 |

FOREIGN PATENT DOCUMENTS

| | | |
|---|---|---|
| JP | 2006-317605 A | 11/2006 |
| JP | 2008-181075 A | 8/2008 |
| JP | 2008-242040 A | 10/2008 |
| JP | 2010-117472 A | 5/2010 |

(Continued)

*Primary Examiner* — Evan P Dzierzynski
*Assistant Examiner* — Alberto J Betancourt
(74) *Attorney, Agent, or Firm* — Canon U.S.A., Inc. IP Division

(57) ABSTRACT

An optical system includes an optical element made of resin and a reflection portion configured to reflect ultraviolet radiation. The reflection portion is provided on an optical surface located closer to an object side than the optical element, and conditional expressions $0.10 \leq Lu/L \leq 0.90$ and $|\tan^{-1}(H0/Lr) - \tan^{-1}\{H0(Lr-Lu)/(Ru \times Lr)\}| \leq 25°$ are satisfied, in which H0 represents a maximum height, from an optical axis, of an optical surface closest to the object side, Lu represents a distance from the optical surface closest to the object side to the reflection portion, Lr represents a distance from the optical surface closest to the object side to the optical element, L represents a total length of the optical system, and Ru represents a radius of curvature of the optical surface on which the reflection portion is provided.

17 Claims, 11 Drawing Sheets

(56) References Cited

FOREIGN PATENT DOCUMENTS

| | | |
|---|---|---|
| JP | 2011-017819 A | 1/2011 |
| WO | 2010/024214 A1 | 3/2010 |

\* cited by examiner

OPTICAL SYSTEM AND OPTICAL APPARATUS INCLUDING THE SAME

BACKGROUND OF THE INVENTION

Field of the Invention

The present invention relates to an optical system that includes an optical element made of resin, and is suitable for an optical apparatus, such as a silver-halide film camera, a digital still camera, a video camera, a telescope, binoculars, a projector, and a digital copier.

Description of the Related Art

In recent years, there is a demand for a small-sized and lightweight optical system (image pickup optical system) having high optical performance as an optical system to be used in an optical apparatus, such as a digital camera and a video camera. Japanese Patent Laid-Open No. 2006-317605 and Japanese Patent Laid-Open No. 2010-117472 each describe an optical system that includes a diffractive optical element or an optical element having anomalous dispersion characteristics. Thus, the size of the optical system is reduced, and a chromatic aberration can be corrected favorably.

However, in each of the optical systems described in Japanese Patent Laid-Open No. 2006-317605 and Japanese Patent Laid-Open No. 2010-117472, an optical element made of resin is used, and thus there is a possibility that the optical characteristics or the shape of the optical element changes when ultraviolet radiation is incident thereon and favorable optical performance may not be obtained. In the optical system described in Japanese Patent Laid-Open No. 2006-317605, an ultraviolet radiation cut coating constituted by a multilayer film is provided on the lens disposed closest to an object side, but this configuration has little blocking effect on ultraviolet radiation having a large angle of incidence and does not provide sufficient environmental resistance.

SUMMARY OF THE INVENTION

The present invention provides an optical system that includes an optical element made of resin and that excels in environmental resistance and also provides an optical apparatus that includes such an optical system.

An optical system according to an aspect of the present invention includes an optical element made of resin and a reflection portion configured to reflect ultraviolet radiation. The reflection portion is provided on an optical surface located closer to an object side than the optical element, and conditional expressions $0.10 \leq Lu/L \leq 0.90$ and $|\tan^{-1}(H0/Lr) - \tan^{-1}\{H0(Lr-Lu)/(Ru \times Lr)\}| 25°$ are satisfied, in which H0 represents a maximum height, from an optical axis, of an optical surface closest to the object side, Lu represents a distance from the optical surface closest to the object side to the reflection portion, Lr represents a distance from the optical surface closest to the object side to the optical element, L represents a total length of the optical system, and Ru represents a radius of curvature of the optical surface on which the reflection portion is provided.

Further features of the present invention will become apparent from the following description of exemplary embodiments with reference to the attached drawings.

DESCRIPTION OF THE EMBODIMENTS

Figure 1:
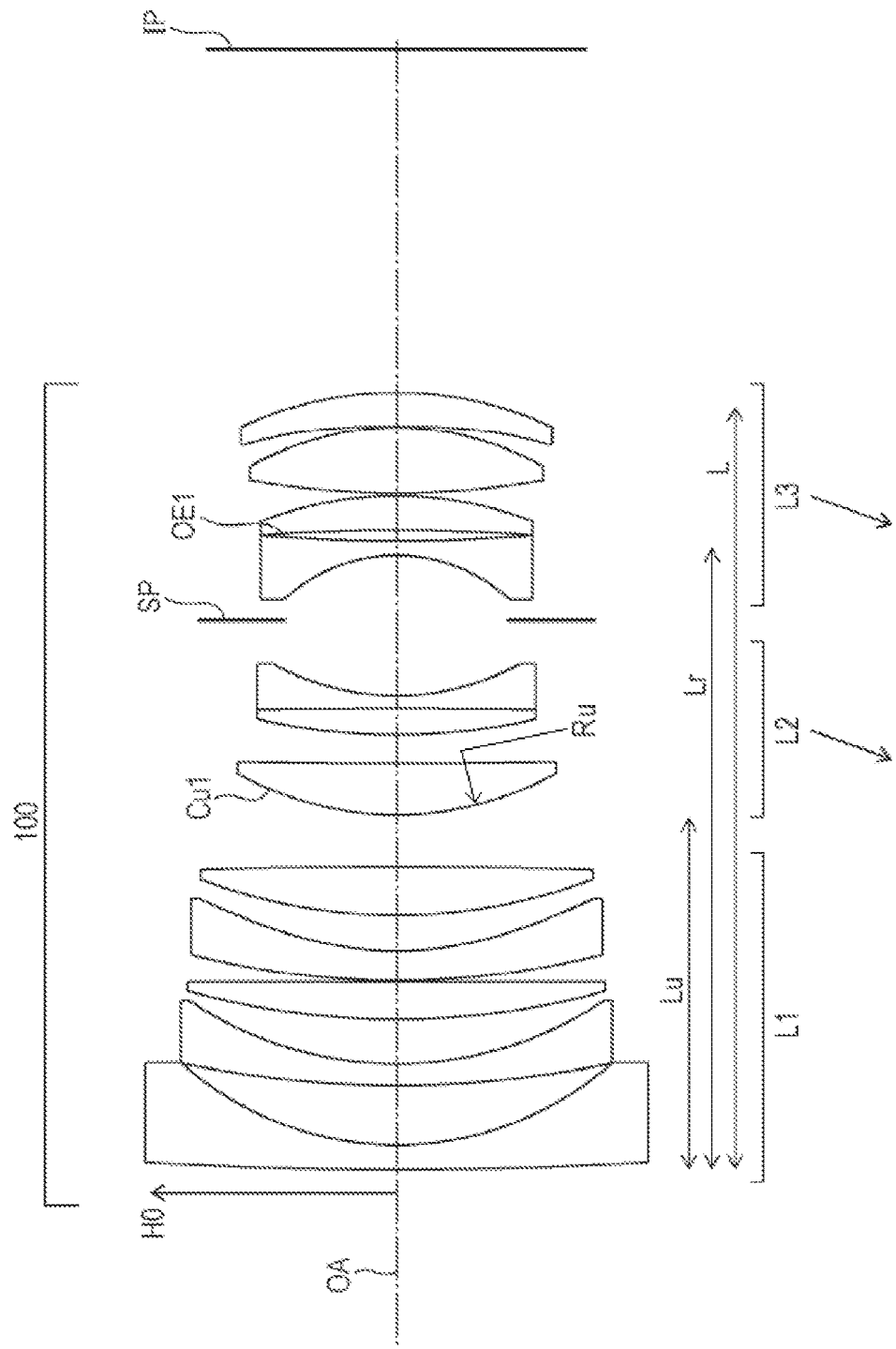
FIG. 1 is a sectional view of an optical system according to a first example of the present invention, illustrating a state in which the optical system is in focus on an object at infinity.

Hereinafter, exemplary embodiments of the present invention will be described with reference to the drawings. It is to be noted that the drawings may be depicted in scales different from the actual scales for convenience. In addition, in the drawings, identical members are given identical reference characters, and duplicate descriptions thereof will be omitted.

FIG. 1 is a schematic diagram illustrating a primary portion of an optical system 100 according to the present exemplary embodiment, taken along a section containing an optical axis (a sectional view of the primary portion). The optical system 100 according to the present exemplary embodiment includes an optical element OE1 made of resin and an ultraviolet radiation reflection portion Cu1 configured to reflect ultraviolet radiation. The ultraviolet radiation reflection portion Cu1 is provided on an optical surface located closer to an object side than the optical element OE1. FIG. 1 also illustrates an optical axis OA, an image plane IP, and an aperture stop SP.

Herein, the maximum height, from the optical axis OA, of the optical surface closest to the object side is represented by H0, the distance from the optical surface closest to the object side to the ultraviolet radiation reflection portion Cu1 is represented by Lu, the distance from the optical surface closest to the object side to the optical element OE1 made of resin is represented by Lr, the total length of the optical system 100 is represented by L, and the radius of curvature of the optical surface on which the ultraviolet radiation reflection portion Cu1 is provided is represented by Ru. In this case, the optical system 100 according to the present exemplary embodiment satisfies the following conditional expressions (1) and (2).

$$0.10 \leq Lu/L \leq 0.90 \quad (1)$$

$$|\tan^{-1}(H0/Lr) - \tan^{-1}\{H0(Lr-Lu)/(Ru \times Lr)\}| 25° \quad (2)$$

The optical system 100 according to the present exemplary embodiment achieves excellent environmental resistance through the configuration described above. The optical system 100 will be described in detail, hereinafter.

An optical element in the present exemplary embodiment refers to an optical member that is made of an inorganic material, such as glass, or an organic material, such as plastics (resin) and that has a refractive function or a diffractive function. A member that has substantially no refractive power, such as a cementing member (adhesive or the like) for cementing a plurality of optical elements, a thin film for preventing reflection or improving adhesion, or a coating material, is not included in an optical element according to the present exemplary embodiment.

Resin in the present exemplary embodiment includes not only a material obtained by solidifying a resin material but also a material obtained by solidifying inorganic fine particles dispersed in an organic material (organic composite material). For example, acryl, polycarbonate, polyvinyl carbazole, a mixture thereof, a material obtaining by mixing any of the above with an organic material or an inorganic material, or the like can be used as the resin.

The term "optical surface" as used in the present exemplary embodiment refers to, of a portion of an optical element having a continuous curved surface (a spherical surface having a constant radius of curvature or an aspherical surface defined by an identical definition expression), a surface (effective surface) through which an effective light ray that contributes to image formation passes. In other words, in each optical element, a marginal portion on an outer peripheral portion of an effective surface provided so as to facilitate processing or to be held by a lens barrel does not correspond to an optical surface according to the present exemplary embodiment even if such a marginal portion has a mirror surface. Accordingly, the maximum height H0 in the conditional expression (2) above represents the distance (effective radius) from the optical axis OA to the position farthest therefrom of the surface of the optical element closest to the object side through which the effective light ray passes.

A diffractive optical element or a refractive optical element having optical characteristics (anomalous dispersion characteristics) different from those of a typical glass material may be used as the optical element OE1 made of resin. Thus, the size of the optical system 100 can be reduced, and a chromatic aberration can be corrected favorably. However, typically, when resin is exposed to ultraviolet radiation, the resin absorbs the ultraviolet radiation, and a polymer chain scission or the like occurs. Thus, the optical characteristics of the resin, such as its refractive index, transmittance, and absorption, or the shape of the resin changes. Therefore, in an optical system that includes an optical element made of resin, there is a possibility that the optical performance changes when ultraviolet radiation is incident on the optical element.

Here, in order to prevent ultraviolet radiation from being incident on an optical element made of resin in an optical system, a method is known in which an ultraviolet radiation blocking portion is provided in the optical system at a position closer to an object side than the optical element. An absorptive type member having a property of absorbing ultraviolet radiation (ultraviolet radiation absorption portion) or a reflective type member that reflects ultraviolet radiation (ultraviolet radiation reflection portion) may be used as the ultraviolet radiation blocking portion. For example, an ultraviolet radiation absorption portion can be formed of an ultraviolet radiation absorbing material, and an ultraviolet radiation reflection portion can be formed of a multilayer film in which a plurality of dielectric layers are stacked.

The ultraviolet radiation blocking effect of the ultraviolet radiation absorption portion is not angular dependent, and thus the amount of ultraviolet radiation that reaches the optical element made of resin can be reduced regardless of the angle of incidence of the ultraviolet radiation. For example, a lens-shaped member having a refractive function, or in other words, a lens made of an ultraviolet radiation absorbing material can be used as the ultraviolet radiation absorption portion. However, the ultraviolet radiation blocking effect of the ultraviolet radiation absorption portion is dependent on the thickness of the ultraviolet radiation absorption portion, and thus the use of a lens-type ultraviolet radiation absorption portion cannot provide an ultraviolet radiation blocking effect that is uniform in the radial direction.

In addition, the kinds of the ultraviolet radiation absorbing materials are limited. Thus, depending on the configuration of an optical system, when a lens-shaped ultraviolet radiation absorbing material is disposed, it may become difficult to obtain favorable optical performance. If a planar ultraviolet radiation absorption portion is to be disposed, a greater number of lenses need to be disposed than in a case in which a lens-shaped ultraviolet radiation absorption portion is disposed, and thus the total length or the weight of the optical system increases.

On the other hand, with an ultraviolet radiation reflection portion, the ultraviolet radiation reflection portion can also be used an antireflection coating to be provided on an optical surface. Thus, no planar filter or the like needs to be provided separately in the optical system, or the number of lenses does not need to be increased. In addition, with the ultraviolet radiation reflection portion, the transmittance characteristics (change in the transmittance with respect to the wavelength) can be made relatively steeper than those of an ultraviolet radiation absorption portion. Thus, an influence on a color balance of the entire optical system can be reduced, and a favorable ultraviolet radiation blocking effect can also be obtained.

However, the transmittance characteristics of the ultraviolet radiation reflection portion are angular dependent in that the transmittance characteristics shift toward the shorter wavelength side as the angle (angle of incidence) formed by the surface normal of the optical surface on which the ultraviolet radiation reflection portion is provided and the incident light ray increases. Therefore, as the angle of incidence of ultraviolet radiation incident on the ultraviolet radiation reflection portion increases, the ultraviolet radiation blocking effect decreases.

Accordingly, in the optical system 100 according to the present exemplary embodiment, the position and the radius of curvature of the optical surface on which the ultraviolet radiation reflection portion Cu1 is provided are set as appropriate so as to satisfy the conditional expressions (1) and (2) above. Thus, an increase in the angle of incidence of ultraviolet radiation is suppressed, and a favorable ultraviolet radiation blocking effect is obtained.

The conditional expression (1) defines the disposition of the ultraviolet radiation reflection portion Cu1 in the optical system 100. As the ultraviolet radiation reflection portion Cu1 is brought closer to the image side, a light ray having a large angle of incidence is less likely to reach the ultraviolet radiation reflection portion Cu1 because such a light ray is blocked by a lens barrel member or the like that holds an optical element. Therefore, by disposing the ultraviolet radiation reflection portion Cu1 away from the surface closest to the object side so as to satisfy the conditional expression (1), a light ray having a large angle of incidence can be blocked sufficiently by a lens barrel member or the like, and a sufficient ultraviolet radiation blocking effect can be obtained.

When the ratio falls below the lower limit of the conditional expression (1), the ultraviolet radiation reflection portion Cu1 is too close to the object side, and ultraviolet radiation having a large angle of incidence passes through the ultraviolet radiation reflection portion Cu1 and reaches the optical element OE1. Thus, a sufficient ultraviolet radiation blocking effect cannot be obtained. In the meantime, when the ratio exceeds the upper limit of the conditional expression (1), it becomes difficult to dispose the ultraviolet radiation reflection portion Cu1 closer to the object side than the optical element OE1.

The conditional expression (2) defines an angle, within a section containing the optical axis OA, formed by a straight line connecting the position of the maximum height H0 of the optical surface closest to the object side and a point on the optical element OE1 that lies on the optical axis OA and the surface normal at a position at which the aforementioned straight line passes through the optical surface on which the ultraviolet radiation reflection portion Cu1 is provided. When the optical surface on which the ultraviolet radiation reflection portion Cu1 is provided is aspherical, a local radius of curvature at a point at which the straight line connecting the position of the maximum height H0 of the optical surface closest to the object side and a point on the optical element OE1 that lies on the optical axis OA intersects with the aspherical surface is represented by Ru.

Typically, in a region in which the conditional expression (1) is satisfied, an optical surface having an extremely large curvature is not disposed in order to reduce various aberrations, and the angle of refraction of a light ray does not become extremely large. Therefore, in the region in which the conditional expression (1) is satisfied, a light ray that is incoming from the position of the maximum height H0, that is refracted and diffracted by each optical surface, and that travels toward a point on the optical element OE1 that lies on the optical axis OA (outermost off-axis light ray) can be approximated as a straight line connecting the position of the maximum height H0 and the point on the optical element OE1 that lies on the optical axis OA. In other words, the left-hand side of the conditional expression (2) corresponds to an angle of incidence of the outermost off-axis light ray with respect to the optical surface on which the ultraviolet radiation reflection portion Cu1 is provided.

By satisfying the conditional expression (2), the angle of incidence of ultraviolet radiation with respect to the optical surface on which the ultraviolet radiation reflection portion Cu1 is provided is reduced, and thus a favorable ultraviolet radiation blocking effect can be obtained. When the angle exceeds the upper limit of the conditional expression (2), the angle of incidence of ultraviolet radiation with respect to the optical surface on which the ultraviolet radiation reflection portion Cu1 is provided becomes too large, and thus a sufficient ultraviolet radiation blocking effect cannot be obtained.

Furthermore, it is preferable that the following conditional expressions (1a), (2a) through (1c), and (2c) be satisfied in order.

$$0.14 \leq Lu/L \leq 0.85 \tag{1a}$$

$$|\tan^{-1}(H0/Lr) - \tan^{-1}\{H0(Lr-Lu)/(Ru \times Lr)\}| 23° \tag{2a}$$

$$0.18 \leq Lu/L \leq 0.80 \tag{1b}$$

$$|\tan^{-1}(H0/Lr) - \tan^{-1}\{H0(Lr-Lu)/(Ru \times Lr)\}| 21° \tag{2b}$$

$$0.22 \leq Lu/L \leq 0.75 \tag{1c}$$

$$|\tan^{-1}(H0/Lr) - \tan^{-1}\{H0(Lr-Lu)/(Ru \times Lr)\}| 19° \tag{2c}$$

In addition, it is desirable that the optical system 100 according to the present exemplary embodiment satisfy the following conditional expression (3).

$$0.20 \leq Lr/L \leq 0.95 \tag{3}$$

By disposing the optical element OE1 sufficiently close to the image side so as to satisfy the conditional expression (3), the amount of ultraviolet radiation that is incident on the optical element OE1 can be reduced because ultraviolet radiation having a large angle of incidence is blocked by a lens barrel member or the like that holds the optical system 100.

Furthermore, it is preferable that the following conditional expressions (3a) through (3c) be satisfied in order.

$$0.30 \leq Lr/L \leq 0.95 \tag{3a}$$

$$0.40 \leq Lr/L \leq 0.90 \tag{3b}$$

$$0.50 \leq Lr/L \leq 0.90 \tag{3c}$$

In addition, it is desirable that the optical system 100 according to the present exemplary embodiment satisfy the following conditional expression (4).

$$0.04 \leq H0^2/(Lr \times Lu) \leq 5 \tag{4}$$

In order to obtain a sufficient ultraviolet radiation blocking effect, it is preferable that a light ray having a large angle of incidence be blocked by a lens barrel member or the like by disposing the ultraviolet radiation reflection portion Cu1 and the optical element OE1 away from the optical surface closest to the object side. In other words, it is preferable that an angle formed by the optical axis OA and each of the straight lines connecting the position of the maximum height H0 of the optical surface closest to the object side and the positions on the ultraviolet radiation reflection portion Cu1 and on the optical element OE1 that lie on the optical axis OA be small. By disposing the ultraviolet radiation reflection portion Cu1 and the optical element OE1 away from the optical surface closest to the object side so as to satisfy the conditional expression (4), ultraviolet radiation can be prevented from reaching the ultraviolet radiation reflection portion Cu1 and the optical element OE1.

Furthermore, it is preferable that the following conditional expressions (4a) through (4c) be satisfied in order.

$$0.08 \leq H0^2/(Lr \times Lu) \leq 3 \quad (4a)$$

$$0.12 \leq H0^2/(Lr \times Lu) \leq 2 \quad (4b)$$

$$0.16 \leq H0^2/(Lr \times Lu) \leq 1.2 \quad (4c)$$

In addition, it is desirable that the optical system 100 according to the present exemplary embodiment satisfy the following conditional expression (5), in which Hu (FIG. 1) represents the maximum height, from the optical axis OA, of the optical surface on which the ultraviolet radiation reflection portion Cu1 is provided.

$$Hu/Ru \leq 0.80 \quad (5)$$

When the ratio exceeds the upper limit of the conditional expression (5), an angle (aperture angle) formed by the optical axis and a tangent line of the optical surface on which the ultraviolet radiation reflection portion Cu1 is provided at the position of the maximum height from the optical axis becomes too large, and it becomes difficult to form the ultraviolet radiation reflection portion Cu1 having a uniform film thickness. When the film thickness of the ultraviolet radiation reflection portion Cu1 is not uniform, the transmittance characteristics thereof (the wavelength characteristics of the transmittance) fail to be uniform, and thus it becomes difficult to obtain an ultraviolet radiation blocking effect that is uniform across the optical surface.

Furthermore, it is preferable that the following conditional expressions (5a) through (5d) be satisfied in order.

$$Hu/Ru \leq 0.75 \quad (5a)$$

$$Hu/Ru \leq 0.70 \quad (5b)$$

$$Hu/Ru \leq 0.65 \quad (5c)$$

$$Hu/Ru \leq 0.60 \quad (5d)$$

In order to obtain a favorable ultraviolet radiation blocking effect, it is desirable that the ultraviolet radiation reflection portion Cu1 have transmittance of no greater than 20% with respect to radiation at a wavelength of 360 nm. More preferably, the ultraviolet radiation reflection portion Cu1 may have transmittance of no greater than 15% with respect to radiation at a wavelength of 360 nm, or even more preferably, the ultraviolet radiation reflection portion Cu1 may have transmittance of no greater than 10%.

In addition, in order not to compromise the transmittance characteristics (color balance) of the entire optical system in a visible light range, it is desirable that the following conditional expression (6) be satisfied, in which $\lambda_{50}$ represents the wavelength at which the transmittance of the ultraviolet radiation reflection portion Cu1 is 50%.

$$365 \text{ nm} \leq \lambda_{50} \leq 430 \text{ nm} \quad (6)$$

Furthermore, it is preferable that the following conditional expressions (6a) and (6b) be satisfied in order.

$$370 \text{ nm} \leq \lambda_{50} \leq 415 \text{ nm} \quad (6a)$$

$$375 \text{ nm} \leq \lambda_{50} \leq 405 \text{ nm} \quad (6b)$$

Furthermore, in order not to compromise the color balance in the entire system of the optical system 100, it is desirable that the transmittance characteristics of the ultraviolet radiation reflection effect of the ultraviolet radiation reflection portion Cu1 be steep. Therefore, it is desirable that the following conditional expression (7) be satisfied, in which $\lambda_{10}$ and $\lambda_{90}$ represent the wavelengths at which the transmittance of the ultraviolet radiation reflection portion Cu1 is 10% and 90%, respectively.

$$\lambda_{90} - \lambda_{10} \leq 30 \text{ nm} \quad (7)$$

Furthermore, it is preferable that the following conditional expressions (7a) and (7b) be satisfied in order.

$$\lambda_{90} - \lambda_{10} \leq 26 \text{ nm} \quad (7a)$$

$$\lambda_{90} - \lambda_{10} \leq 22 \text{ nm} \quad (7b)$$

In addition, in order to obtain favorable transmittance characteristics with respect to light in a visible light range, it is desirable that the ultraviolet radiation reflection portion Cu1 have transmittance of no less than 80% in a wavelength range from 480 nm to 660 nm. More preferably, the ultraviolet radiation reflection portion Cu1 may have transmittance of no less than 85% in a wavelength range from 480 nm to 660 nm, or even more preferably, the ultraviolet radiation reflection portion Cu1 may have transmittance of no less than 90%.

As described above, an optical element made of resin having an anomalous dispersion property may be used as the optical element OE1 according to the present exemplary embodiment. Herein, in order to favorably correct a chromatic aberration in the optical system 100, it is desirable that the following conditional expression (8) be satisfied, in which $\Delta\theta gF$ represents the anomalous dispersion property of the optical element OE1 with respect to a g-line and an F-line.

$$0.0272 < |\Delta\theta gF| \quad (8)$$

Furthermore, it is preferable that the following conditional expressions (8a) and (8b) be satisfied in order.

$$0.05 < |\Delta\theta gF| \quad (8a)$$

$$0.1 < |\Delta\theta gF| \quad (8b)$$

Herein, the refractive indices with respect to the g-line (435.8 nm), the F-line (486.1 nm), the d-line (587.6 nm), and the C-line (656.3 nm), which are the Fraunhofer lines, are represented by ng, nF, nd, and nC, respectively. In this case, the Abbe number vd with respect to the d-line, the partial dispersion ratio $\theta gF$ with respect to the g-line and the F-line, and the anomalous dispersion property $\Delta\theta gF$ with respect to the g-line and the F-line are defined by the following expressions (9) through (11), respectively.

$$vd = (nd-1)/(nF-nC) \quad (9)$$

$$\theta gF = (ng-nF)/(nF-nC) \quad (10)$$

$$\Delta\theta gF = \theta gF - (-1.665 \times 10^{-7} vd^3 + 5.213 \times 10^{-5} vd^2 - 5.656 \times 10^{-3} vd + 0.7278) \quad (11)$$

When a material obtained by mixing fine particles of an inorganic oxide (e.g., $TiO_2$, ITO (Indium-Tin-Oxide), or the like) in a solid material is used as a material for the optical element OE1, it is necessary to prevent light from being scattered by the fine particles of the inorganic oxide. Accordingly, it is preferable that the particle size of the fine particles be set to fall within a range from 2 nm to 50 nm. In addition, a dispersing agent or the like may be added in order to suppress aggregation occurring when mixing the fine particles of an inorganic oxide in a solid material.

Here, the refractive index $n(\lambda)$ of a mixture in which fine particles are dispersed in a solid material (base material) with respect to the wavelength $\lambda$ can be derived through a relational expression that is based on the Maxwell-Garnett theory. Specifically, the refractive index n(λ) is expressed through the following expression (13) on the basis of the relative permittivity $\varepsilon_{av}$ of the mixture defined by the following expression (12), in which $\varepsilon_m$ represents the relative permittivity of the solid material, $\varepsilon_p$ represents the relative permittivity of the fine particles, and η represents the fraction of the total volume of the fine particles with respect to the volume of the solid material.

$$\varepsilon_{av} = \left[1 + \frac{3\eta\left(\frac{\varepsilon_p - \varepsilon_m}{\varepsilon_p + 2\varepsilon_m}\right)}{1 - \eta\left(\frac{\varepsilon_p - \varepsilon_m}{\varepsilon_p + 2\varepsilon_m}\right)}\right] \quad (12)$$

$$n(\lambda) = \sqrt{\varepsilon_{av}(\lambda)} \quad (13)$$

In this manner, with the optical system 100 according to the present exemplary embodiment, excellent environmental resistance can be ensured even when an optical element made of resin is used. It is to be noted that the optical system 100 according to the present exemplary embodiment may include a plurality of ultraviolet radiation reflection portions or a plurality of optical elements made of resin. In that case, it is desirable that each of the plurality of ultraviolet radiation reflection portions and each of the plurality of optical elements satisfy the conditional expressions described above.

Now, examples of the optical system according to the present exemplary embodiment will be described in detail.

First Example

Hereinafter, an optical system 100 according to a first example of the present invention will be described in detail. The optical system 100 according to the present example is similar to the optical system 100 (FIG. 1) according to the exemplary embodiment described above.

Figure 2:
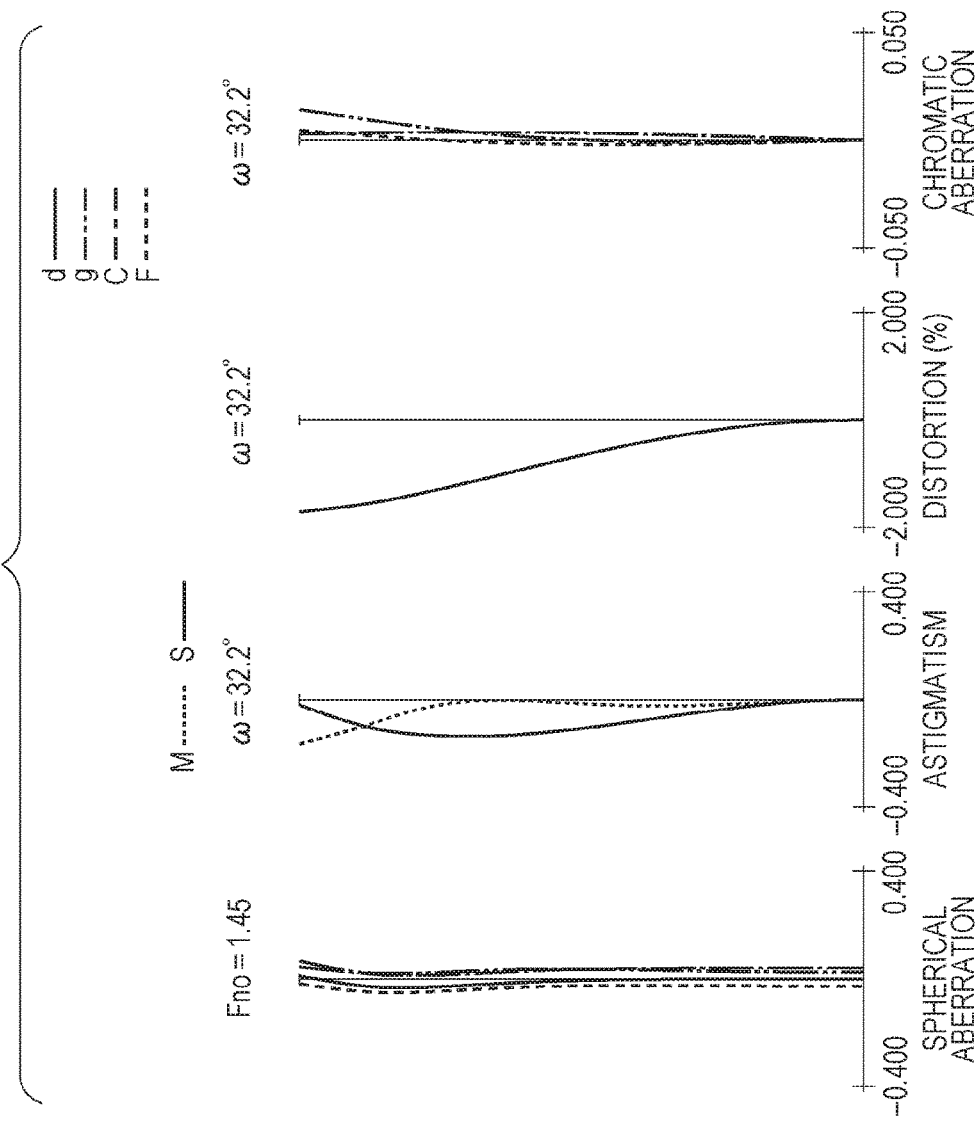
FIG. 2 is an aberration diagram of the optical system according to the first example of the present invention, illustrating a state in which the optical system is in focus on an object at infinity.

As illustrated in FIG. 1, the optical system 100 according to the present example is constituted by a first lens unit (lens unit) L1 having a negative refractive power, a second lens unit L2 having a positive refractive power, and a third lens unit L3 having a positive refractive power that are arranged in order from the object side to the image side. In the optical system 100, the distance between the lens units changes during focusing. FIG. 1 illustrates a section in which the optical system 100 is in focus on an object at infinity, and the arrows in FIG. 1 indicate the movement loci of the lens units in the optical axis direction when the focus of the optical system 100 moves from an object at infinity to an object in a closer range. FIG. 2 is an aberration diagram obtained when the optical system 100 is in focus on an object at infinity.

An ultraviolet radiation reflection portion Cu1 according to the present example is constituted by a multilayer film and is provided on the object-side optical surface of the optical element (sixth lens) that is sixth from the object side in the optical system 100. The optical surface on which the ultraviolet radiation reflection portion Cu1 is provided is a curved surface (convex surface) that projects toward the object side. In the optical system 100, the ultraviolet radiation reflection portion Cu1 may be provided on the optical surface of a fourth lens on the object side, and the conditional expressions described above are satisfied in this case as well.

An optical element OE1 according to the present example is a refractive lens having a positive refractive power that is made of a mixture in which $TiO_2$ fine particles are dispersed in a (meth)acrylic monomer at a volume ratio of 25%. The optical element OE1 is disposed in the third lens unit L3, which is on the image side of the aperture stop SP. In the present example, the ultraviolet radiation reflection portion Cu1 is disposed closer to the object side than the optical element OE1, and the aperture stop SP is disposed between the ultraviolet radiation reflection portion Cu1 and the optical element OE1. Thus, an ultraviolet radiation blocking effect is obtained.

In the section that contains the optical axis OA, the height (light ray height), from the optical axis OA, of a position on the optical surface on which the ultraviolet radiation reflection portion Cu1 is provided at which the light ray that travels from the position of the maximum height H0 of the optical surface closest to the object side toward an intersection of the optical axis OA and the optical surface of the optical element OE1 on the object side is incident is 17.43 mm. In addition, the angle (surface normal angle) of the surface normal of the optical surface on which the ultraviolet radiation reflection portion Cu1 is provided with respect to the optical axis OA at the position at which the aforementioned light ray is incident on the ultraviolet radiation reflection portion Cu1 is 27.7 degrees. Thus, the angle formed by this light ray and the surface normal is 9.1 degrees. Thus, it is understood that the angle of incidence of the light ray incident on the ultraviolet radiation reflection portion Cu1 is sufficiently small.

It is to be noted that the value of this angle is calculated with refraction or the like of the light ray at each optical surface taken into consideration, and thus this value is somewhat different from the value of the angle calculated through the conditional expression (2). However, as long as the conditional expression (2) is satisfied, the effect of the present invention can be obtained.

Second Example

Figure 3:
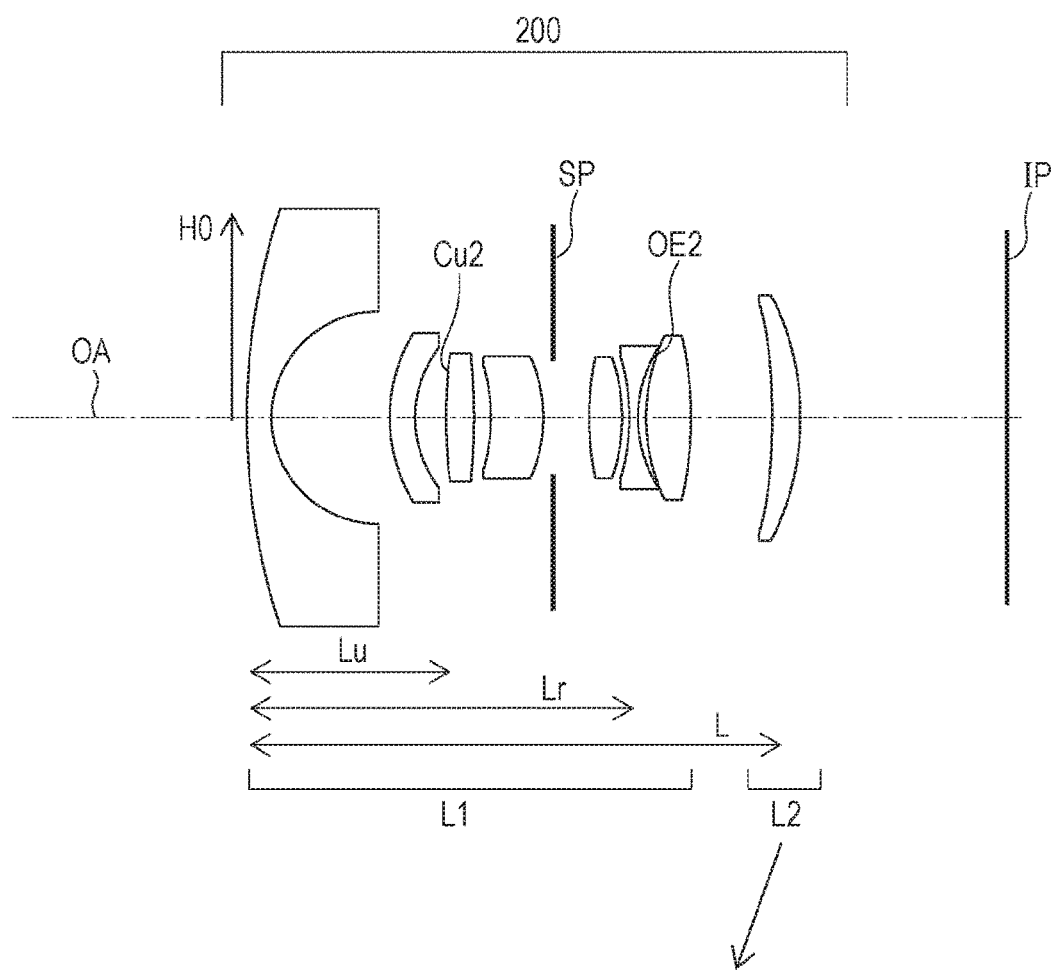
FIG. 3 is a sectional view of an optical system according to a second example of the present invention, illustrating a state in which the optical system is in focus on an object at infinity.
Figure 4:
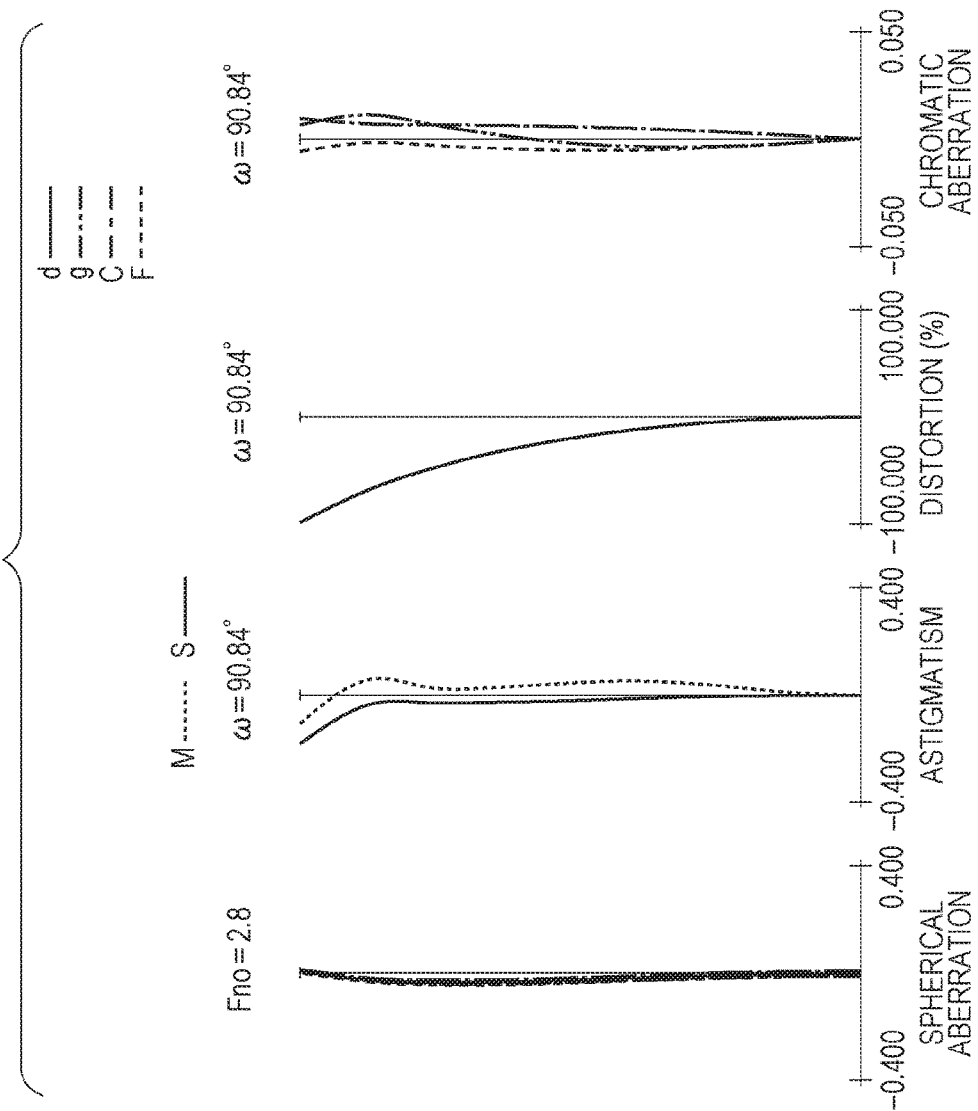
FIG. 4 is an aberration diagram of the optical system according to the second example of the present invention, illustrating a state in which the optical system is in focus on an object at infinity.

FIG. 3 is a sectional view of a primary portion of an optical system 200 according to a second example of the present invention, and FIG. 4 is an aberration diagram obtained when the optical system 200 is in focus on an object at infinity. With respect to the optical system 200 according to the present example, descriptions of the configurations that are equivalent to those of the optical system 100 according to the first example will be omitted.

The optical system 200 according to the present example is constituted by a first lens unit L1 having a positive refractive power and a second lens unit L2 having a positive refractive power that are arranged in order from the object side to the image side. In the optical system 200, as indicated by the arrow in FIG. 3, the second lens unit L2 moves in the optical axis direction when the focus of the optical system 200 moves from an object at infinity to an object in a closer range.

An ultraviolet radiation reflection portion Cu2 according to the present example is constituted by a multilayer film and is provided on the optical surface of a third lens on the object side in the optical system 200. The optical surface on which the ultraviolet radiation reflection portion Cu2 is provided is a curved surface that projects toward the object side. In addition, an optical element OE2 according to the present example is a refractive lens having a positive refractive power that is made of a (meth)acrylic monomer and is disposed in the first lens unit L1 at a position closer to the image side than the aperture stop SP. In the optical system 200, the ultraviolet radiation reflection portion Cu2 may be provided on the optical surface of a second lens on the object side, and the conditional expressions described above are satisfied in this case as well.

In the section that contains the optical axis OA, the light ray height of a position on the optical surface on which the ultraviolet radiation reflection portion Cu2 is provided at which the light ray that travels from the position of the maximum height H0 of the optical surface closest to the object side toward an intersection of the optical axis OA and the optical surface of the optical element OE2 on the object side is incident is 4.18 mm. In addition, the surface normal angle of the optical surface on which the ultraviolet radiation reflection portion Cu2 is provided at the position at which the aforementioned light ray is incident thereon is 6.1 degrees. Thus, the angle formed by this light ray and the surface normal is 7.7 degrees. Thus, it is understood that the angle of incidence of the light ray incident on the ultraviolet radiation reflection portion Cu2 is sufficiently small.

Third Example

Figure 5:
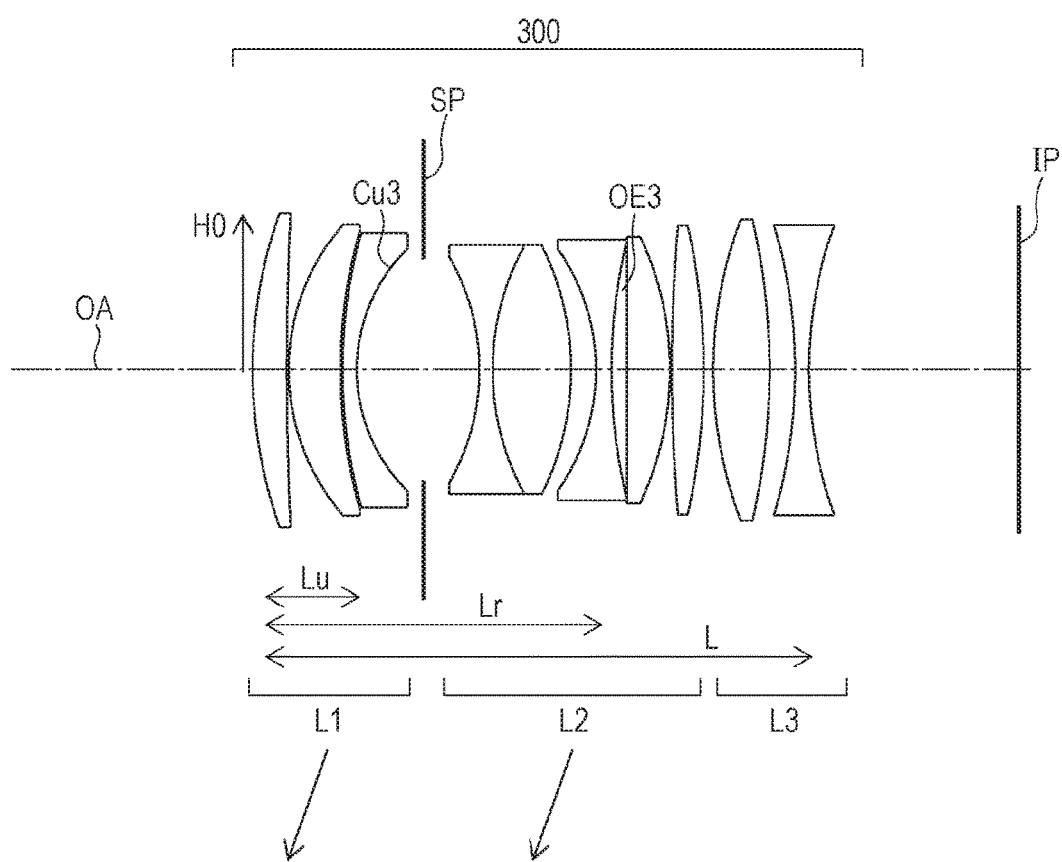
FIG. 5 is a sectional view of an optical system according to a third example of the present invention, illustrating a state in which the optical system is in focus on an object at infinity.
Figure 6:
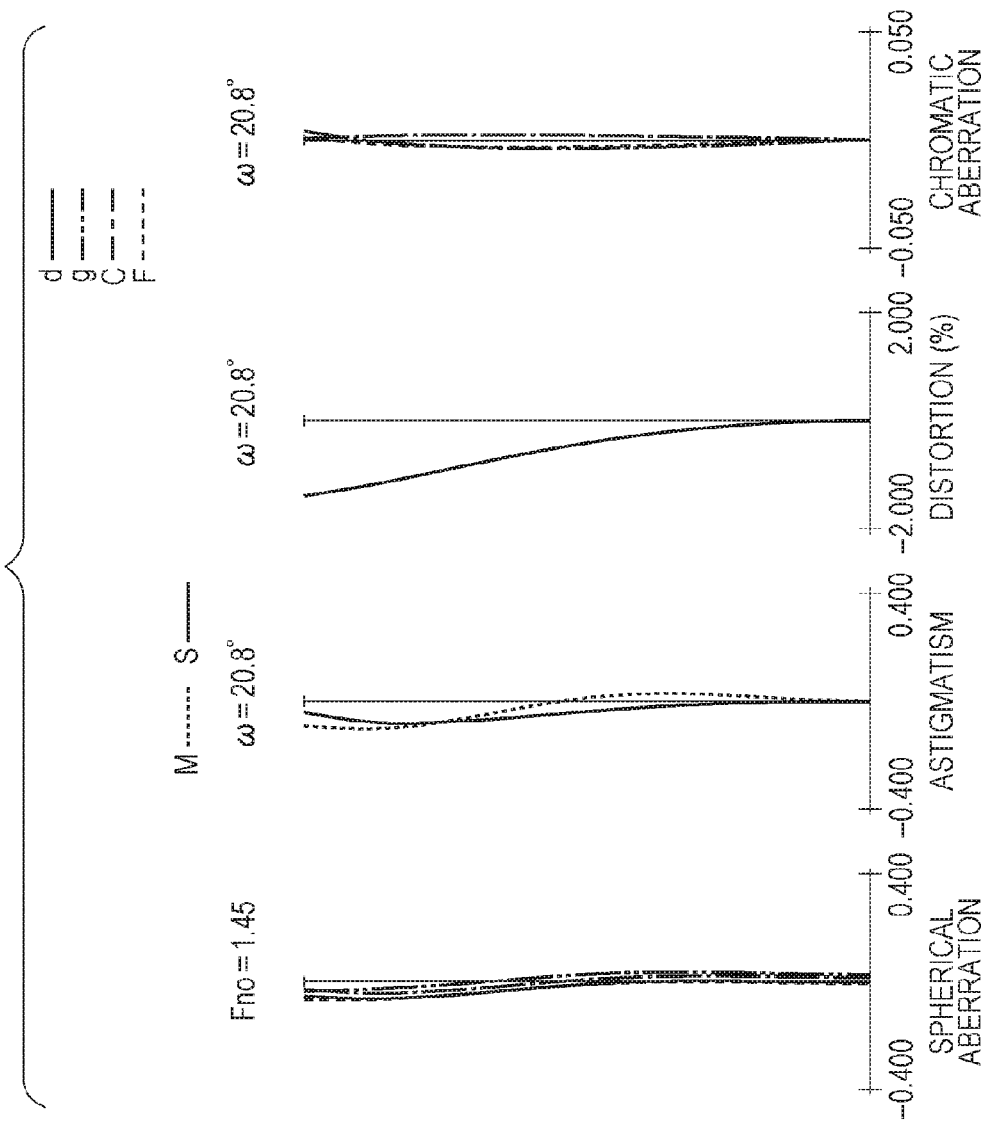
FIG. 6 is an aberration diagram of the optical system according to the third example of the present invention, illustrating a state in which the optical system is in focus on an object at infinity.

FIG. 5 is a sectional view of a primary portion of an optical system 300 according to a third example of the present invention, and FIG. 6 is an aberration diagram obtained when the optical system 300 is in focus on an object at infinity. With respect to the optical system 300 according to the present example, descriptions of the configurations that are equivalent to those of the optical system 100 according to the first example will be omitted.

The optical system 300 according to the present example is constituted by a first lens unit L1 having a positive refractive power, a second lens unit L2 having a positive refractive power, and a third lens unit L3 having a negative refractive power that are arranged in order from the object side to the image side. In the optical system 300, when the focus of the optical system 300 moves from an object at infinity to an object in a closer range, as indicated by the arrows in FIG. 5, the first lens unit L1 and the second lens unit L2 move in the optical axis direction, and thus the distance between the lens units changes.

An ultraviolet radiation reflection portion Cu3 according to the present example is constituted by a multilayer film and is provided on the optical surface of a third lens on the image side in the optical system 300. The optical surface on which the ultraviolet radiation reflection portion Cu3 is provided is a curved surface that projects toward the object side. In addition, an optical element OE3 according to the present example is a refractive lens having a positive refractive power that is made of a (meth)acrylic monomer and is disposed in the second lens unit L2, which is on the image side of the aperture stop SP. In the optical system 300, the ultraviolet radiation reflection portion Cu3 may be provided on the cementing surface between a fourth lens and a fifth lens, and the conditional expressions described above are satisfied in this case as well.

In the section that contains the optical axis OA, the light ray height of a position on the optical surface on which the ultraviolet radiation reflection portion Cu3 is provided at which the light ray that travels from the position of the maximum height H0 of the optical surface closest to the object side toward an intersection of the optical axis OA and the optical surface of the optical element OE3 on the object side is incident is 7.54 mm. In addition, the surface normal angle of the optical surface on which the ultraviolet radiation reflection portion Cu3 is provided at the position at which the aforementioned light ray is incident thereon is 32 degrees. Thus, the angle formed by this light ray and the surface normal is 1.1 degrees. Thus, it is understood that the angle of incidence of the light ray incident on the ultraviolet radiation reflection portion Cu3 is sufficiently small.

Fourth Example

Figure 7:
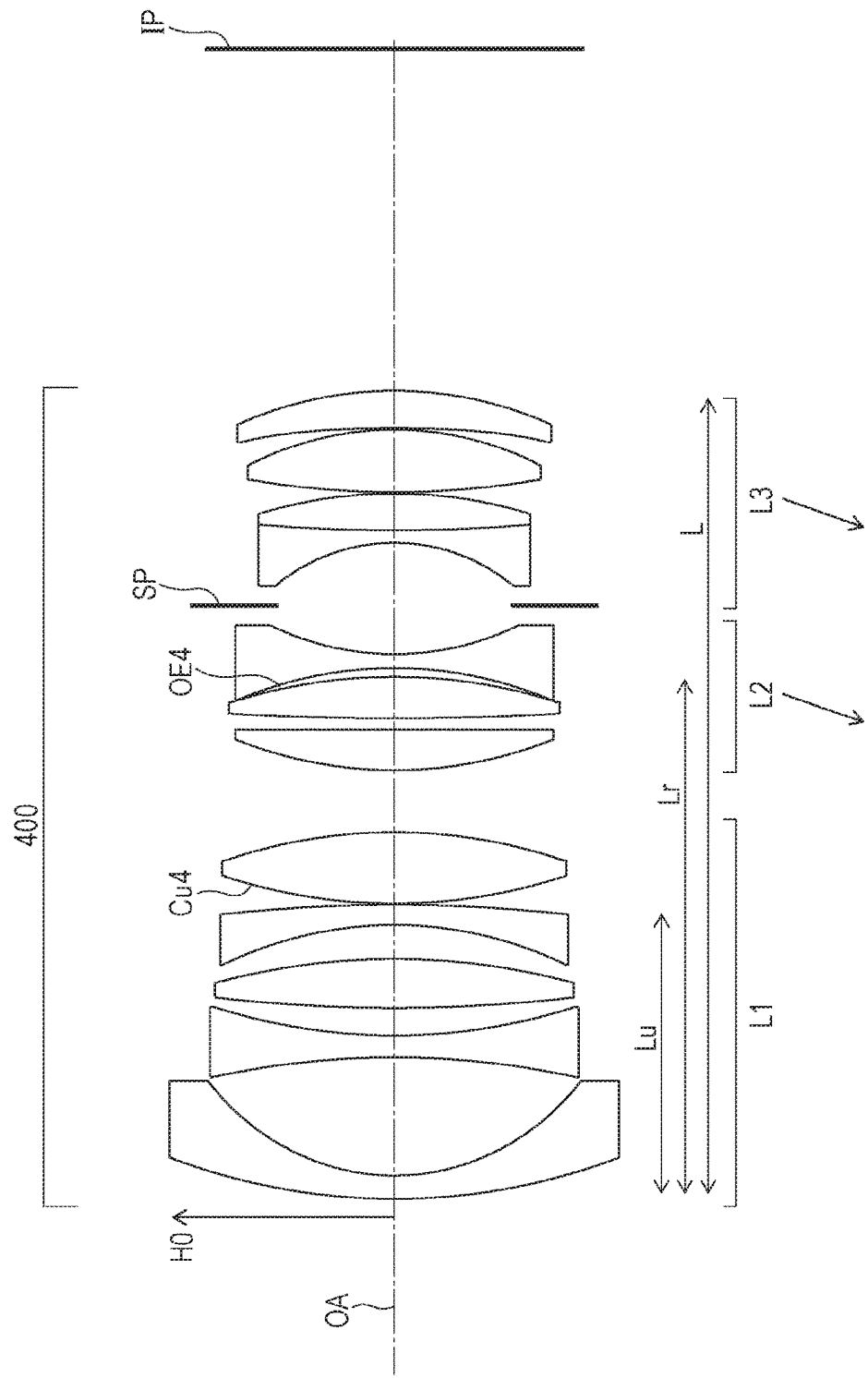
FIG. 7 is a sectional view of an optical system according to a fourth example of the present invention, illustrating a state in which the optical system is in focus on an object at infinity.
Figure 8:
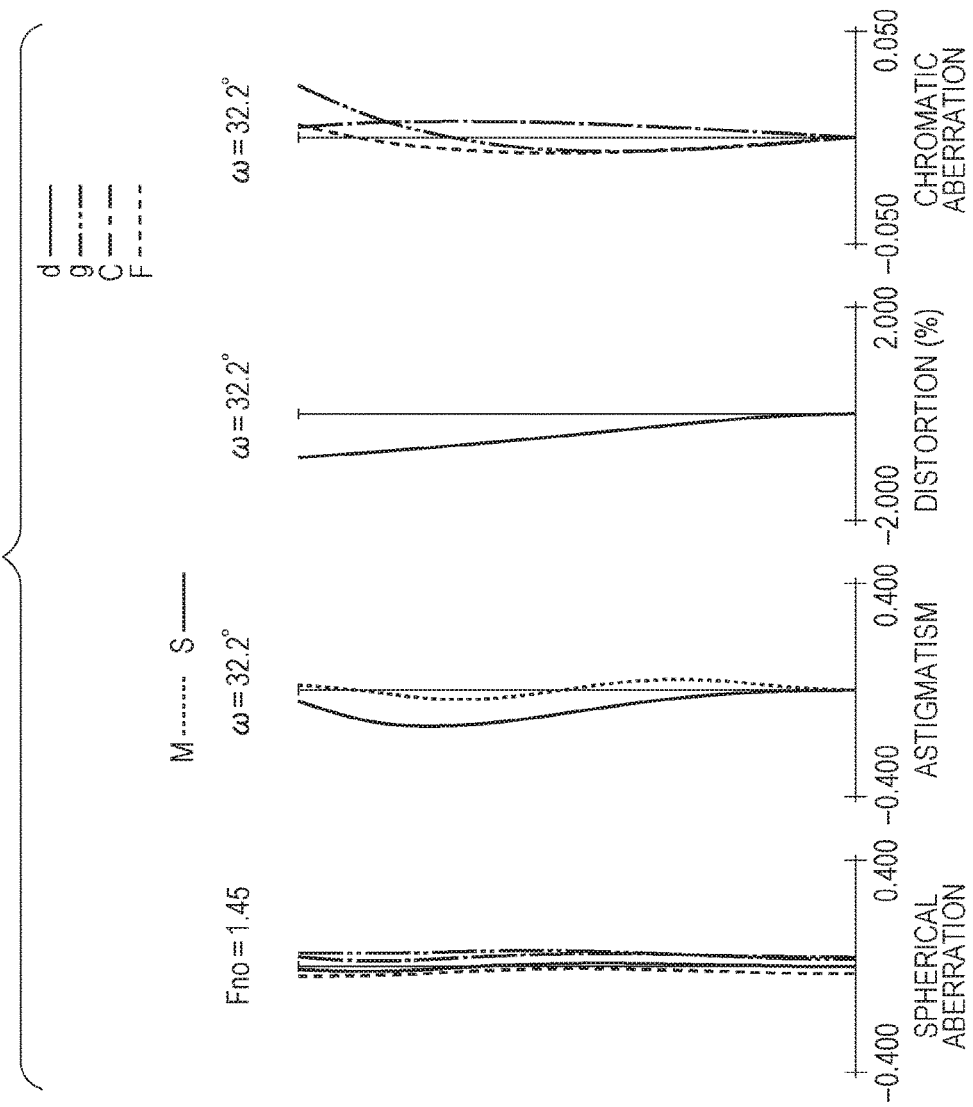
FIG. 8 is an aberration diagram of the optical system according to the fourth example of the present invention, illustrating a state in which the optical system is in focus on an object at infinity.

FIG. 7 is a sectional view of a primary portion of an optical system 400 according to a fourth example of the present invention, and FIG. 8 is an aberration diagram obtained when the optical system 400 is in focus on an object at infinity. With respect to the optical system 400 according to the present example, descriptions of the configurations that are equivalent to those of the optical system 100 according to the first example will be omitted.

The optical system 400 according to the present example is constituted by a first lens unit L1 having a positive refractive power, a second lens unit L2 having a positive refractive power, and a third lens unit L3 having a positive refractive power that are arranged in order from the object side to the image side. In the optical system 400, when the focus of the optical system 400 moves from an object at infinity to an object in a closer range, as indicated by the arrows in FIG. 7, the second lens unit L2 and the third lens unit L3 move in the optical axis direction, and thus the distance between the lens units changes.

An ultraviolet radiation reflection portion Cu4 according to the present example is constituted by a multilayer film and is provided on the optical surface of a fifth lens on the object side in the optical system 400. The optical surface on which the ultraviolet radiation reflection portion Cu4 is provided is a curved surface that projects toward the object side. In addition, an optical element OE4 according to the present example is a refractive lens having a positive refractive power that is made of a (meth)acrylic monomer and is disposed in the second lens unit L2, which is on the object side of the aperture stop SP.

In the section that contains the optical axis OA, the light ray height of a position on the optical surface on which the ultraviolet radiation reflection portion Cu4 is provided at which the light ray that travels from the position of the maximum height H0 of the optical surface closest to the object side toward an intersection of the optical axis OA and the optical surface of the optical element OE4 on the object side is incident is 12.54 mm. In addition, the surface normal angle of the optical surface on which the ultraviolet radiation reflection portion Cu4 is provided at the position at which the aforementioned light ray is incident thereon is 11.6 degrees. Thus, the angle formed by this light ray and the surface normal is 7.0 degrees. Thus, it is understood that the angle of incidence of the light ray incident on the ultraviolet radiation reflection portion Cu4 is sufficiently small.

Fifth Example

Figure 9:
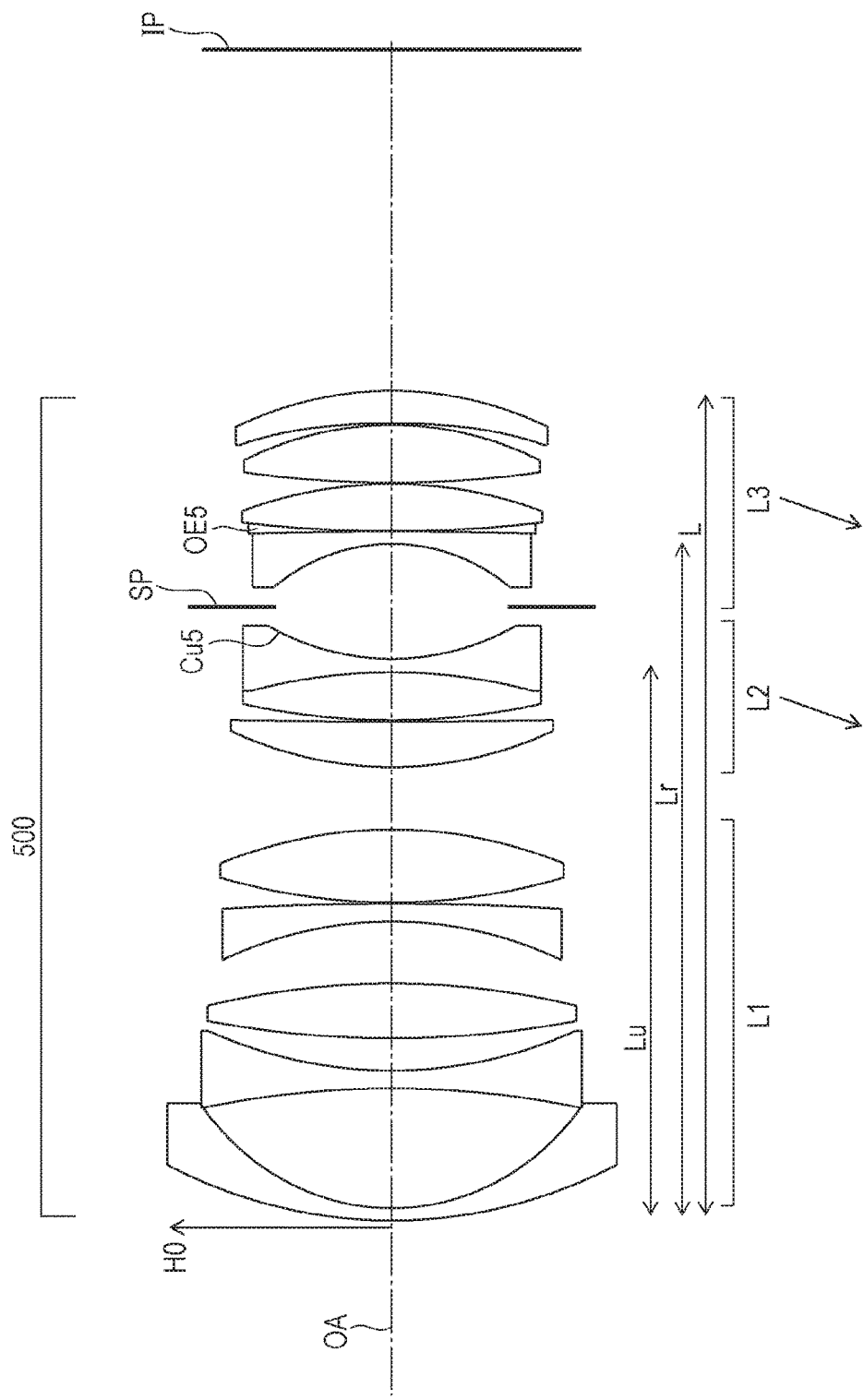
FIG. 9 is a sectional view of an optical system according to a fifth example of the present invention, illustrating a state in which the optical system is in focus on an object at infinity.
Figure 10:
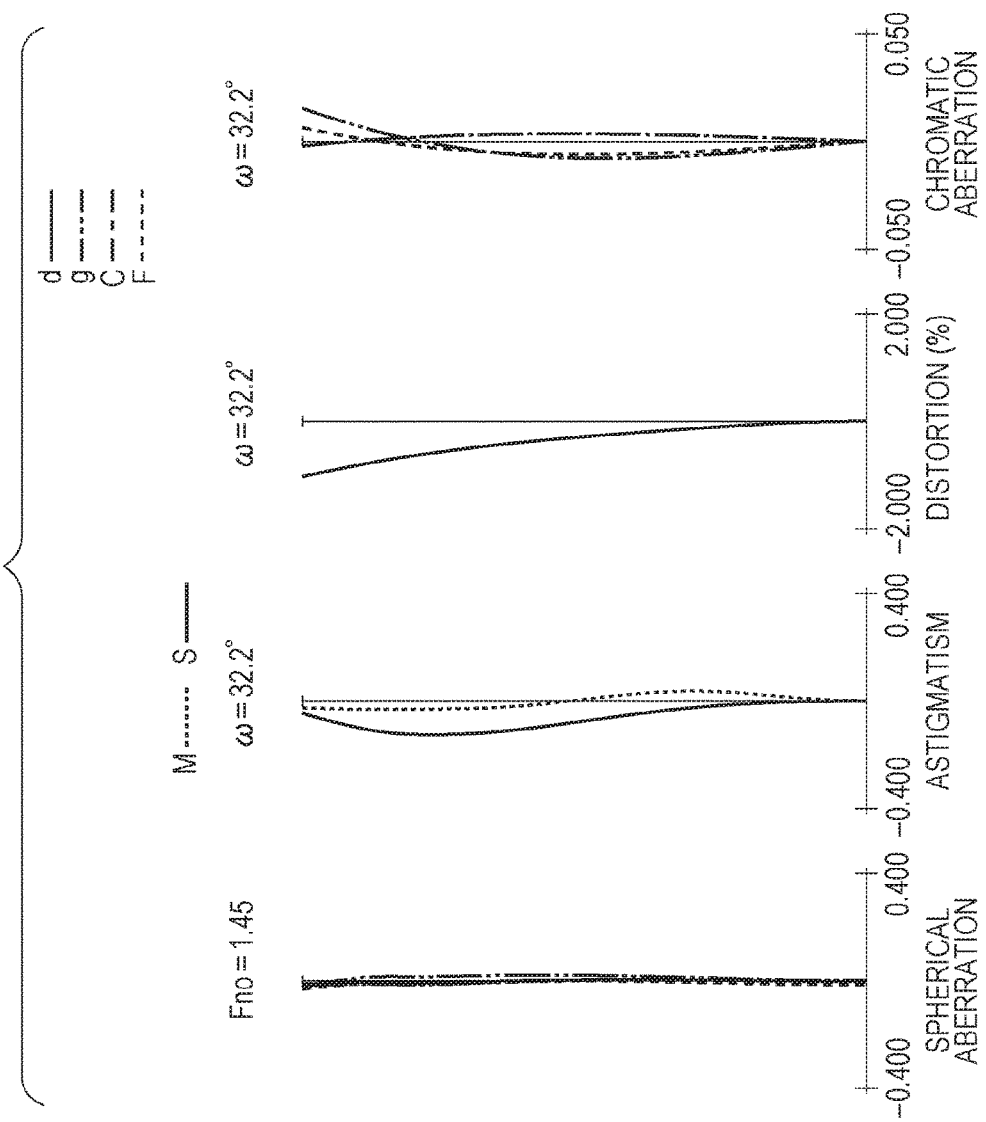
FIG. 10 is an aberration diagram of the optical system according to the fifth example of the present invention, illustrating a state in which the optical system is in focus on an object at infinity.

FIG. 9 is a sectional view of a primary portion of an optical system 500 according to a fifth example of the present invention, and FIG. 10 is an aberration diagram obtained when the optical system 500 is in focus on an object at infinity. With respect to the optical system 500 according to the present example, descriptions of the configurations that are equivalent to those of the optical system 100 according to the first example will be omitted.

The optical system 500 according to the present example is constituted by a first lens unit L1 having a positive refractive power, a second lens unit L2 having a positive refractive power, and a third lens unit L3 having a positive refractive power that are arranged in order from the object side to the image side. In the optical system 500, when the focus of the optical system 500 moves from an object at infinity to an object in a closer range, as indicated by the arrows in FIG. 9, the second lens unit L2 and the third lens unit L3 move in the optical axis direction, and thus the distance between the lens units changes.

An ultraviolet radiation reflection portion Cu5 according to the present example is constituted by a multilayer film and is provided on the optical surface of an eighth lens on the image side in the optical system 500. The optical surface on which the ultraviolet radiation reflection portion Cu5 is provided is a curved surface that projects toward the object side. In addition, an optical element OE5 according to the present example is a refractive lens having a negative refractive power that is made of a mixture in which ITO fine particles are dispersed in a (meth)acrylic monomer at a volume ratio of 15% and is disposed in the third lens unit L3, which is on the image side of the aperture stop SP.

In the section that contains the optical axis OA, the light ray height of a position on the optical surface on which the ultraviolet radiation reflection portion Cu5 is provided at which the light ray that travels from the position of the maximum height H0 of the optical surface closest to the object side toward an intersection of the optical axis OA and the optical surface of the optical element OE5 on the object side is incident is 7.53 mm. In addition, the surface normal angle of the optical surface on which the ultraviolet radiation reflection portion Cu5 is provided at the position at which the aforementioned light ray is incident thereon is 15.3 degrees. Thus, the angle formed by this light ray and the surface normal is 8.1 degrees. Thus, it is understood that the angle of incidence of the light ray incident on the ultraviolet radiation reflection portion Cu5 is sufficiently small.

In the present example, the ultraviolet radiation reflection portion Cu5 is constituted by a multilayer film that contains $SiO_2$ (nd=1.46) and $TiO_2$ (nd=2.32), and an interface therebetween is used to suppress passage of radiation in an ultraviolet range. Table 1 shows the configuration of the ultraviolet radiation reflection portion Cu5 according to the present example. It is to be noted that Table 1 shows the refractive index nd with respect to the d-line (587.6 nm). In addition, in the present example, S-LAH55 of OHARA Inc. is used as a material for the substrate.

TABLE 1

| LAYER | nd | PHYSICAL FILM THICKNESS [nm] |
|---|---|---|
| 12 | 1.46 | 90.3 |
| 11 | 2.32 | 41.0 |
| 10 | 1.46 | 44.6 |
| 9 | 2.32 | 29.6 |
| 8 | 1.46 | 57.1 |
| 7 | 2.32 | 23.6 |
| 6 | 1.46 | 66.7 |
| 5 | 2.32 | 23.2 |
| 4 | 1.46 | 66.8 |
| 3 | 2.32 | 24.2 |
| 2 | 1.46 | 44.7 |
| 1 | 2.32 | 16.7 |
| SUBSTRATE | 1.83481 | — |

Figure 11:
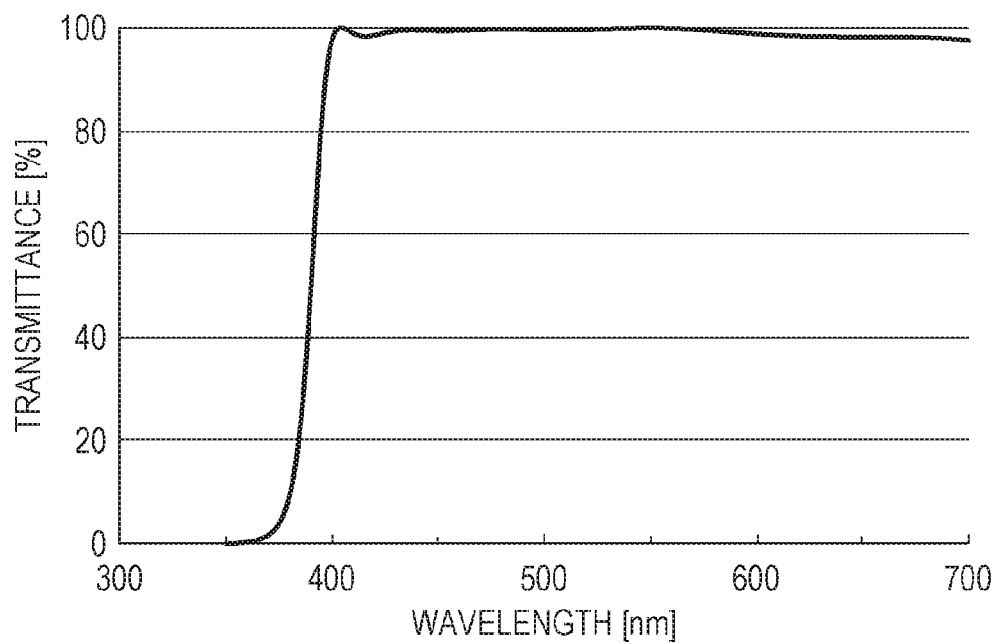
FIG. 11 illustrates transmittance characteristics of an ultraviolet radiation reflection portion according to the fifth example of the present invention.

FIG. 11 illustrates the transmittance characteristics of the ultraviolet radiation reflection portion Cu5 according to the present example. FIG. 11 reveals that the transmittance characteristics of the ultraviolet radiation reflection portion Cu5 are steep around the ultraviolet range (around 400 nm) and that a favorable ultraviolet radiation blocking effect is being obtained. Specifically, the ultraviolet radiation reflection portion Cu5 has transmittance of 10%, 50%, and 90% with respect to radiation at wavelengths of 376 nm, 390 nm, and 400 nm, respectively, and $\lambda_{90} - \lambda_{10}$ is 24 nm. In addition, the ultraviolet radiation reflection portion Cu5 has transmittance of no greater than 3% with respect to radiation at a wavelength of 360 nm, and has transmittance of no less than 95% with respect to light within a wavelength range from 480 nm to 660 nm.

Next, specific numerical data of first through fifth numerical examples corresponding to the foregoing first through fifth examples, respectively, will be provided. In each of the numerical examples, the surface number indicates the numerical location (m) of a given surface counted from the light-incident side, r[mm] represents the radius of curvature of the mth optical surface (mth surface), and d[mm] represents the on-axis distance (distance along the optical axis) between the mth surface and the (m+1)th surface. In addition, nd and vd represent the refractive index and the Abbe number, respectively, of the mth optical member with respect to the d-line. In each of the numerical examples, units of parameters respectively representing distance, position, length is [mm] and a unit of angle of view is [deg].

In each of the numerical examples, an optical surface having an aspherical surface shape is indicated by adding (asterisk) following the surface number. In addition, "e±XX" in the aspherical coefficient means "×10$^{±xx}$." An aspherical surface shape of an optical surface is expressed through the following expression (14), in which X represents the amount of displacement from the surface vertex in the optical axis direction, h represents the height from the optical axis in a direction perpendicular to the optical axis direction, r represents the paraxial radius of curvature, k represents the conic constant, and B, C, D, E, . . . represent the aspherical coefficients.

$$x = \frac{h^2/r}{1 + \sqrt{1 - (1+k)(h/r)^2}} + Bh^4 + Ch^6 + Dh^8 + Eh^{10} + \ldots \quad (14)$$

First Numerical Example

| surface number | r | d | nd | vd | effective diameter |
|---|---|---|---|---|---|
| 1 | 480.322 | 2.82 | 1.67270 | 32.1 | 55.79 |
| 2 | 36.983 | 6.74 | | | 47.80 |
| 3 | 119.552 | 2.46 | 1.51742 | 52.4 | 47.72 |
| 4 | 42.361 | 5.06 | | | 45.90 |
| 5 | 90.295 | 4.27 | 1.90366 | 31.3 | 46.24 |
| 6 | −18601.026 | 0.15 | | | 46.10 |
| 7 | 93.603 | 3.43 | 1.58313 | 59.4 | 45.43 |
| 8* | 39.044 | 4.01 | | | 43.41 |
| 9 | 62.996 | 5.50 | 1.91082 | 35.3 | 43.38 |
| 10 | −756.556 | (variable) | | | 42.91 |
| 11 | 37.467 | 5.79 | 1.83481 | 42.7 | 34.86 |
| 12 | 779.999 | 3.27 | | | 34.14 |
| 13 | 72.301 | 2.99 | 1.59522 | 67.7 | 30.47 |
| 14 | −1236.876 | 1.50 | 1.72825 | 28.5 | 29.64 |
| 15 | 28.912 | (variable) | | | 26.78 |
| 16 (aperture) | ∞ | 7.36 | | | 25.30 |
| 17 | −18.879 | 1.64 | 1.84666 | 23.8 | 24.50 |
| 18 | 197.444 | 1.21 | 1.69934 | 26.4 | 28.47 |
| 19 | −209.968 | 3.90 | 1.91082 | 35.3 | 28.61 |
| 20 | −42.029 | 0.27 | | | 29.63 |
| 21 | 92.376 | 7.48 | 1.59522 | 67.7 | 31.68 |
| 22 | −33.657 | 0.15 | | | 32.00 |

-continued

First Numerical Example

| | | | | | |
|---|---|---|---|---|---|
| 23* | −106.635 | 3.88 | 1.85400 | 40.4 | 33.05 |
| 24 | −41.586 | 39.05 | | | 34.12 |
| image plane | ∞ | | | | | aspherical surface data

8th surface

K = 0.00000e+000  B = −3.29635e−006  C = −1.06088e−009
D = −8.09890e−012  E = 1.33588e−014  F = −9.49240e−018

23rd surface

K = 0.00000e+000  B = −6.98994e−006  C = −7.36799e−010
D = −7.33127e−012  E = 6.43354e−015 various pieces of data

| | |
|---|---|
| focal length | 34.30 |
| F-number | 1.45 |
| angle of view | 32.24 |
| image height | 21.64 |
| total lens length | 127.48 |
| BF | 39.05 |

| object distance | infinity | 1750 | 1000 | 500 | 300 |
|---|---|---|---|---|---|
| d10 | 5.93 | 5.48 | 5.09 | 3.97 | 1.70 |
| d15 | 8.60 | 8.30 | 8.07 | 7.45 | 6.48 |

| | |
|---|---|
| entrance pupil position | 34.66 |
| exit pupil position | −43.12 |
| front principal point position | 54.64 |
| rear principal point position | 4.75 | lens unit data

| unit | starting surface | focal length | lens configuration length | front principal point position | rear principal point position |
|---|---|---|---|---|---|
| 1 | 1 | −396.15 | 34.44 | −96.68 | −163.46 |
| 2 | 11 | 116.60 | 13.56 | −20.89 | −25.39 |
| 3 | 16 | 42.30 | 25.90 | 23.59 | 10.19 | single lens data

| lens | starting surface | focal length |
|---|---|---|
| 1 | 1 | −59.72 |
| 2 | 3 | −128.19 |
| 3 | 5 | 99.45 |
| 4 | 7 | −117.60 |
| 5 | 9 | 64.05 |
| 6 | 11 | 46.98 |
| 7 | 13 | 114.86 |
| 8 | 14 | −38.77 |
| 9 | 17 | −20.28 |
| 10 | 18 | 145.68 |
| 11 | 19 | 57.06 |
| 12 | 21 | 42.38 |
| 13 | 23 | 77.69 |

Second Numerical Example

| surface number | r | d | nd | vd | effective diameter |
|---|---|---|---|---|---|
| 1 | 49.172 | 1.80 | 1.72916 | 54.7 | 29.18 |
| 2 | 7.731 | 8.54 | | | 15.12 |
| 3 | 11.844 | 1.83 | 1.74320 | 49.3 | 11.33 |
| 4 | 8.327 | 2.25 | | | 9.43 |
| 5 | 39.257 | 2.03 | 1.84666 | 23.8 | 8.62 |
| 6 | −45.502 | 1.21 | | | 7.78 |

-continued

Second Numerical Example

| | | | | | |
|---|---|---|---|---|---|
| 7 | −13.730 | 3.85 | 1.72916 | 54.7 | 7.07 |
| 8 | −10.941 | 0.69 | | | 8.22 |
| 9 (aperture) | ∞ | 2.62 | | | 8.21 |
| 10 | 21.663 | 2.39 | 1.49700 | 81.5 | 8.18 |
| 11 | −13.589 | 0.52 | | | 7.99 |
| 12 | −15.907 | 0.64 | 1.72825 | 28.5 | 8.27 |
| 13 | 9.609 | 0.57 | | | 9.69 |
| 14 | 13.950 | 3.25 | 1.63556 | 22.7 | 9.79 |
| 15 | −27.106 | (variable) | | | 11.02 |
| 16* | −52.965 | 2.04 | 1.58313 | 59.4 | 15.91 |
| 17 | −19.867 | (variable) | | 54.7 | 16.68 |
| image plane | ∞ | | | | | aspherical surface data

16th surface

K = 0.00000e+000  B = −6.57616e−005  C = 2.99433e−007
D = −4.07412e−009  E = 2.53079e−011  F = −2.25245e−014 various pieces of data

| | |
|---|---|
| focal length | 9.60 |
| F-number | 2.80 |
| angle of view | 181.7 |
| image height | 13.66 |
| total lens length | 55.13 |
| BF | (variable) |

| object distance | infinity | 480 | 90 |
|---|---|---|---|
| d15 | 5.89 | 5.44 | 1.79 |
| d17 (BF) | 15.00 | 15.46 | 19.11 |

| | |
|---|---|
| entrance pupil position | 8.62 |
| exit pupil position | −22.89 |
| front principal point position | 15.79 |
| rear principal point position | 5.40 | lens unit data

| unit | starting surface | focal length | lens configuration length | front principal point position | rear principal point position |
|---|---|---|---|---|---|
| 1 | 1 | 13.10 | 32.19 | 16.93 | 14.25 |
| 2 | 16 | 53.31 | 2.04 | 2.02 | 0.76 | single lens data

| lens | starting surface | focal length |
|---|---|---|
| 1 | 1 | −12.82 |
| 2 | 3 | −48.47 |
| 3 | 5 | 25.17 |
| 4 | 7 | 46.68 |
| 5 | 10 | 17.19 |
| 6 | 12 | −8.14 |
| 7 | 13 | 46.21 |
| 8 | 14 | 14.59 |
| 9 | 16 | 53.31 |

Third Numerical Example

| surface number | r | d | nd | vd | effective diameter |
|---|---|---|---|---|---|
| 1 | 39.433 | 2.83 | 1.72916 | 54.7 | 24.91 |
| 2 | 281.196 | 0.15 | | | 24.61 |
| 3 | 18.518 | 4.27 | 1.49700 | 81.5 | 22.99 |

Third Numerical Example

| | | | | | |
|---|---|---|---|---|---|
| 4 | 42.242 | 0.17 | | | 21.69 |
| 5 | 42.828 | 1.18 | 1.51742 | 52.4 | 21.57 |
| 6 | 14.224 | 5.52 | | | 18.97 |
| 7 (aperture) | ∞ | (variable) | | | 18.37 |
| 8 | −18.831 | 1.08 | 1.72047 | 34.7 | 17.61 |
| 9 | 21.511 | 6.53 | 1.80400 | 46.6 | 19.07 |
| 10 | −23.161 | 2.06 | | | 19.50 |
| 11 | −17.544 | 1.28 | 1.69895 | 30.1 | 18.92 |
| 12 | 46.103 | 1.27 | 1.63429 | 23.3 | 20.48 |
| 13 | −3465.813 | 3.56 | 1.83481 | 42.7 | 20.51 |
| 14 | −26.089 | 0.15 | | | 22.92 |
| 15* | 131.720 | 2.63 | 1.80400 | 46.6 | 22.51 |
| 16 | −55.435 | (variable) | | | 22.83 |
| 17 | 35.765 | 4.64 | 1.58313 | 59.4 | 23.85 |
| 18 | −56.187 | 2.11 | | | 23.71 |
| 19 | −42.552 | 1.15 | 1.56732 | 42.8 | 22.93 |
| 20 | 34.975 | 17.38 | | 54.7 | 22.64 |
| image plane | ∞ | | | | | aspherical surface data

15th surface

K = 0.00000e+000    B = −3.48818e−006    C = 4.64092e−008
D = −5.55436e−010   E = 3.41931e−012     F = −8.48042e−015 various pieces of data

| | |
|---|---|
| focal length | 36.00 |
| F-number | 1.45 |
| half angle of view (degree) | 20.78 |
| image height | 13.66 |
| total lens length | 63.38 |
| BF | 17.38 |

| | infinity | ×0.25 | ×0.5 |
|---|---|---|---|
| d 7 | 4.60 | 7.33 | 5.90 |
| d16 | 0.80 | 11.86 | 23.62 |

| | |
|---|---|
| entrance pupil position | 15.94 |
| exit pupil position | −35.04 |
| front principal point position | 27.22 |
| rear principal point position | −18.62 | lens unit data

| unit | starting surface | focal length | | | |
|---|---|---|---|---|---|
| 1 | 1 | 78.74 | 8.60 | −11.84 | −15.01 |
| 2 | 8 | 38.87 | 18.56 | 16.88 | 10.44 |
| 3 | 17 | −6597.19 | 7.90 | 851.23 | 748.86 | single lens data

| lens | starting surface | focal length |
|---|---|---|
| 1 | 1 | 62.59 |
| 2 | 3 | 62.60 |
| 3 | 5 | −41.75 |
| 4 | 8 | −13.78 |
| 5 | 9 | 14.84 |
| 6 | 11 | −18.03 |
| 7 | 12 | 71.74 |
| 8 | 13 | 31.47 |
| 9 | 15 | 48.83 |
| 10 | 17 | 38.19 |
| 11 | 19 | −33.66 |

Fourth Numerical Example

| surface number | r | d | nd | vd | effective diameter |
|---|---|---|---|---|---|
| 1 | 72.080 | 2.65 | 1.58313 | 59.4 | 50.00 |
| 2* | 25.512 | 13.45 | | | 41.33 |
| 3 | −96.609 | 2.50 | 1.48749 | 70.2 | 40.75 |
| 4 | 66.944 | 3.13 | | | 39.59 |
| 5 | 175.419 | 5.63 | 1.91082 | 35.3 | 39.68 |
| 6 | −77.862 | 3.86 | | | 39.54 |
| 7 | −44.606 | 2.30 | 1.69895 | 30.1 | 38.10 |
| 8 | −178.782 | 0.15 | | | 38.34 |
| 9 | 62.257 | 8.11 | 1.59522 | 67.7 | 38.01 |
| 10 | −59.637 | (variable) | | | 37.40 |
| 11 | 48.797 | 4.61 | 2.00100 | 29.1 | 35.03 |
| 12 | 9939.838 | 1.32 | | | 34.39 |
| 13 | 333.607 | 4.76 | 1.60311 | 60.6 | 32.67 |
| 14 | −61.478 | 1.00 | 1.63556 | 22.4 | 31.18 |
| 15 | −45.844 | 1.59 | 1.72825 | 28.5 | 30.99 |
| 16 | 32.360 | (variable) | | | 27.20 |
| 17 (aperture) | ∞ | 7.17 | | | 26.60 |
| 18 | −21.286 | 1.40 | 1.69895 | 30.1 | 25.93 |
| 19 | 177.619 | 4.21 | 1.59522 | 67.7 | 28.93 |
| 20 | −52.749 | 0.15 | | | 29.70 |
| 21 | 97.355 | 7.19 | 1.59522 | 67.7 | 31.37 |
| 22 | −35.549 | 0.15 | | | 32.12 |
| 23* | −158.409 | 4.26 | 1.85400 | 40.4 | 33.44 |
| 24 | −43.693 | (variable) | | | 34.50 |
| image plane | ∞ | | | | | aspherical surface data

2nd surface

K = 0.00000e+000    B = −1.26283e−006    C = −4.27073e−009
D = 5.04254e−012    E = −1.12945e−014

23rd surface

K = 0.00000e+000    B = −6.35905e−006    C = −4.47403e−010
D = −4.21764e−012   E = 2.36025e−015 various pieces of data

| | |
|---|---|
| focal length | 34.30 |
| F-number | 1.45 |
| angle of view | 32.24 |
| image height | 21.64 |
| total lens length | 131.15 |
| BF | 39.00 |

| object distance | infinity | 1750 | 300 |
|---|---|---|---|
| d10 | 7.06 | 6.32 | 0.80 |
| d18 | 5.50 | 5.50 | 5.50 |
| d26 | 39.00 | 39.74 | 45.26 |

| | |
|---|---|
| entrance pupil position | 35.71 |
| exit pupil position | −37.10 |
| front principal point position | 54.55 |
| rear principal point position | 4.70 | lens unit data

| unit | starting surface | focal length | lens configuration length | front principal point position | rear principal point position |
|---|---|---|---|---|---|
| 1 | 1 | 170.03 | 41.79 | 78.71 | 82.50 |
| 2 | 11 | 783.13 | 13.28 | −152.17 | −134.21 |
| 3 | 17 | 44.42 | 24.52 | 22.40 | 8.09 | single lens data

| lens | starting surface | focal length |
|---|---|---|
| 1 | 1 | −69.17 |
| 2 | 3 | −80.71 |
| 3 | 5 | 59.84 |
| 4 | 7 | −85.64 |

Fourth Numerical Example -continued

| | | |
|---|---|---|
| 5 | 9 | 52.48 |
| 6 | 11 | 48.98 |
| 7 | 13 | 86.47 |
| 8 | 14 | 276.77 |
| 9 | 15 | −25.83 |
| 10 | 18 | −27.12 |
| 11 | 19 | 68.80 |
| 12 | 21 | 44.65 |
| 13 | 23 | 69.46 |

Fifth Numerical Example

| surface number | r | d | nd | vd | effective diameter |
|---|---|---|---|---|---|
| 1 | 55.052 | 1.39 | 1.58313 | 59.4 | 50.00 |
| 2* | 25.148 | 13.72 | | | 42.43 |
| 3 | −106.406 | 2.03 | 1.51633 | 64.1 | 42.14 |
| 4 | 50.816 | 3.68 | | | 40.61 |
| 5 | 113.354 | 6.23 | 1.91082 | 35.3 | 40.83 |
| 6 | −89.012 | 7.06 | | | 40.66 |
| 7 | −44.957 | 2.03 | 1.69895 | 30.1 | 37.20 |
| 8 | −336.413 | 0.17 | | | 37.42 |
| 9 | 69.607 | 8.37 | 1.59522 | 67.7 | 37.46 |
| 10 | −50.652 | (variable) | | | 37.88 |
| 11 | 43.189 | 5.19 | 2.00100 | 29.1 | 35.48 |
| 12 | 1039.705 | 0.14 | | | 34.68 |
| 13 | 78.829 | 5.45 | 1.59522 | 67.7 | 32.76 |
| 14 | −62.807 | 1.54 | 1.85026 | 32.3 | 31.30 |
| 15 | 28.545 | (variable) | | | 27.08 |
| 16 (aperture) | ∞ | 7.24 | | | 26.48 |
| 17 | −20.859 | 1.40 | 1.71736 | 29.5 | 25.82 |
| 18 | −526.799 | 0.05 | 1.54402 | 19.6 | 28.63 |
| 19 | 150.060 | 5.37 | 1.69680 | 55.5 | 29.15 |
| 20 | −49.018 | 0.15 | | | 30.23 |
| 21 | 122.455 | 6.57 | 1.65160 | 58.5 | 31.49 |
| 22 | −37.407 | 0.19 | | | 32.50 |
| 23* | −82.464 | 3.70 | 1.85400 | 40.4 | 33.20 |
| 24 | −40.578 | (variable) | | | 34.31 |
| image plane | ∞ | | | | | aspherical surface data

2nd surface

K = 0.00000e+000   B = −1.17609e−006   C = −3.67097e−009
D = 4.77220e−012   E = −1.15057e−014

24th surface

K = 0.00000e+000   B = −6.57816e−006   C = −1.77654e−010
D = −5.21093e−012  E = 4.55629e−015

Fifth Numerical Example -continued various pieces of data

| | |
|---|---|
| focal length | 34.30 |
| F-number | 1.45 |
| angle of view | 32.24 |
| image height | 21.64 |
| total lens length | 133.69 |
| BF | 39.00 |

| object distance | infinity | 1750 | 300 |
|---|---|---|---|
| d10 | 7.10 | 6.36 | 0.80 |
| d15 | 5.92 | 5.92 | 5.92 |
| d24 | 39.00 | 39.74 | 45.30 |

| | |
|---|---|
| entrance pupil position | 35.71 |
| exit pupil position | −37.10 |
| front principal point position | 54.55 |
| rear principal point position | 4.70 | lens unit data

| unit | starting surface | focal length | lens configuration length | front principal point position | rear principal point position |
|---|---|---|---|---|---|
| 1 | 1 | 185.01 | 44.67 | 86.61 | 92.68 |
| 2 | 11 | 594.71 | 12.33 | −126.75 | −110.20 |
| 3 | 16 | 44.66 | 24.67 | 22.33 | 8.15 | single lens data

| lens | starting surface | focal length |
|---|---|---|
| 1 | 1 | −80.78 |
| 2 | 3 | −66.32 |
| 3 | 5 | 55.56 |
| 4 | 7 | −74.46 |
| 5 | 9 | 50.57 |
| 6 | 11 | 44.90 |
| 7 | 13 | 59.58 |
| 8 | 14 | −22.90 |
| 9 | 17 | −30.31 |
| 10 | 18 | −214.68 |
| 11 | 19 | 53.62 |
| 12 | 21 | 44.70 |
| 13 | 23 | 89.89 |

Table 2 shows the numerical values of the algebraic parts in the conditional expressions (1) through (5) for the optical systems according to the respective numerical examples, and Table 3 shows the optical characteristics of the optical element made of resin according to each of the numerical examples. In addition, Table 4 shows the optical characteristics of the base material and the mixed fine particles in the mixture constituting the optical element made of resin according to the third example.

TABLE 2

| | FIRST EXAMPLE | SECOND EXAMPLE | THIRD EXAMPLE | FOURTH EXAMPLE | FIFTH EXAMPLE |
|---|---|---|---|---|---|
| H0 | 27.90 | 14.59 | 12.46 | 25.00 | 25.00 |
| Hu | 17.43 | 4.31 | 9.48 | 19.01 | 13.54 |
| L | 88.43 | 40.12 | 46.00 | 92.16 | 94.69 |
| Lr | 71.53 | 28.37 | 29.69 | 59.55 | 78.66 |
| Lu | 40.37 | 14.43 | 8.60 | 33.68 | 64.11 |
| Ru | 37.47 | 39.26 | 14.22 | 62.26 | 28.55 |
| CONDITIONAL EXPRESSION (1) | 0.46 | 0.36 | 0.19 | 0.37 | 0.68 |
| CONDITIONAL EXPRESSION (2) | 3.33 | 16.86 | 9.12 | 12.88 | 8.42 |

TABLE 2-continued

|  | FIRST EXAMPLE | SECOND EXAMPLE | THIRD EXAMPLE | FOURTH EXAMPLE | FIFTH EXAMPLE |
|---|---|---|---|---|---|
| CONDITIONAL EXPRESSION (3) | 0.81 | 0.71 | 0.65 | 0.65 | 0.83 |
| CONDITIONAL EXPRESSION (4) | 0.27 | 0.52 | 0.61 | 0.31 | 0.12 |
| CONDITIONAL EXPRESSION (5) | 0.47 | 0.11 | 0.67 | 0.31 | 0.47 |

TABLE 3

|  | FIRST EXAMPLE | SECOND EXAMPLE | THIRD EXAMPLE | FOURTH EXAMPLE | FIFTH EXAMPLE |
|---|---|---|---|---|---|
| ng | 1.73891 | 1.67533 | 1.67256 | 1.67533 | 1.57125 |
| nF | 1.71882 | 1.65605 | 1.65408 | 1.65605 | 1.56143 |
| nd | 1.69934 | 1.63556 | 1.63428 | 1.63556 | 1.54402 |
| nC | 1.69232 | 1.62808 | 1.62686 | 1.62808 | 1.53375 |
| vd | 26.4 | 22.7 | 23.3 | 22.7 | 19.7 |
| θgF | 0.758 | 0.689 | 0.679 | 0.689 | 0.355 |
| ΔθgF | 0.146 | 0.065 | 0.057 | 0.065 | −0.281 |

TABLE 4

|  | ng | nF | nd | nC | vd | θgF |
|---|---|---|---|---|---|---|
| (METH) ACRYLIC MONOMER | 1.53706 | 1.53133 | 1.52415 | 1.52116 | 51.55 | 0.563 |
| TiO$_2$ FINE PARTICLE | 2.45676 | 2.37452 | 2.30377 | 2.28032 | 13.84 | 0.873 |
| ITO FINE PARTICLE | 1.99244 | 1.94870 | 1.85712 | 1.79794 | 5.69 | 0.290 |

Optical Apparatus

Figure 12:
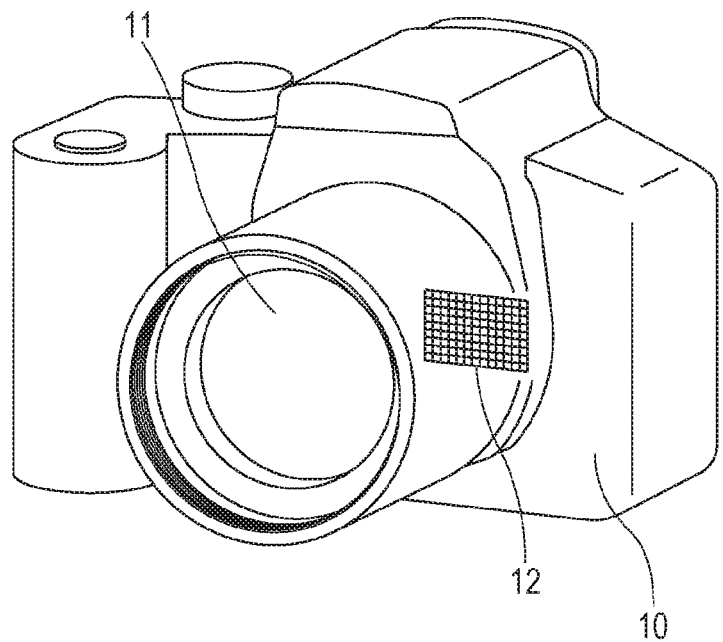
FIG. 12 is a perspective view of an optical apparatus according to an exemplary embodiment of the present invention.

FIG. 12 is a schematic diagram illustrating a primary portion of an image pickup apparatus (digital still camera) serving as an optical apparatus according to an exemplary embodiment of the present invention. The image pickup apparatus according to the present exemplary embodiment includes a camera body 10, an optical system (image pickup optical system) 11 according to any one of the examples described above, and a light receiving element (image pickup element) 12 configured to receive light from the image pickup optical system 11 and subject an object image formed by the image pickup optical system 11 to photoelectric conversion.

With the image pickup apparatus according to the present exemplary embodiment, by employing an optical system according to any one of the examples described above, high optical performance can be obtained, and a high-quality image can be acquired. A solid-state image pickup element (electronic image pickup element), such as a charge-coupled device (CCD) sensor or a complementary metal-oxide semiconductor (CMOS) sensor, can be used as the light receiving element 12. In this case, the image quality of an output image can be increased by electrically correcting various aberrations, including a distortion aberration and a chromatic aberration, of the image acquired by the light receiving element 12.

It is to be noted that the optical system according to the examples described above is not limited to the digital still camera illustrated in FIG. 12 and can be applied to a variety of optical apparatuses, including a silver-halide film camera, a video camera, a telescope, binoculars, a projector, and a digital copier. For example, when the present invention is applied to a projector, the "object side" as used in the exemplary embodiments described above may be replaced with a "light source side."

Thus far, exemplary embodiments and examples of the present invention have been described, but the present invention is not limited to these exemplary embodiments and examples, and various combinations, modifications, and changes can be made within the spirit of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-148159 filed Jul. 27, 2015, which is hereby incorporated by reference herein in its entirety.

What is claimed is:

1. An optical system comprising:
a first optical surface located closest to an object side of the optical system;
a first optical element made of resin having an anomalous dispersion property with respect to a g-line and an F-line;
a second optical surface located between the first optical surface and the first optical element; and
a reflection portion provided on the second optical surface and configured to reflect ultraviolet radiation, and
a second optical element made of other than resin and located closest to an image side of the optical system, and wherein the anomalous dispersion property is represented by the expression $0.0272<|\Delta\theta gF|$, and wherein $\theta gF=(ng-nF)/(nF-nC)$, where ng, nF, nd, and nC respectively represents refractive index of Fraunhofer lines: the g-line, the F-line, a d-line, and a C-line, wherein, to suppress ultraviolet radiation from entering into the first optical element, the optical system satisfies the following conditional expressions:

$0.10 \leq Lu/L \leq 0.90$, $|\tan^{-1}(H0/Lr) - \tan^{-1}\{H0(Lr-Lu)/(Ru \times Lr)\}| \leq 25°$, where Lu represents a distance along an optical axis of the optical system, measured from the first optical surface to the reflection portion, L represents a distance along the optical axis as measured from the first optical surface to the image side of the second optical element, H0 represents a maximum height of the first optical surface as measured from the optical axis, Lr represents a distance along the optical axis as measured from the first optical surface to the first optical element, and Ru represents a radius of curvature of the second optical surface.

2. The optical system according to claim 1, wherein Lr/L is not less than 0.20 and does not exceed 0.95.

3. The optical system according to claim 1, wherein to suppress the reflection portion from having a non-uniform film thickness, a conditional expression $0.04 \leq H0^2/(Lr \times Lu) \leq 5$ is satisfied.

4. The optical system according to claim 1, wherein, to suppress the reflection portion from having a non-uniform film thickness, Hu/Ru does not exceed 0.80, where Hu represents the maximum height of the second optical surface as measured from the optical axis.

5. The optical system according to claim 1, wherein the reflection portion has transmittance of no greater than 20% with respect to radiation at a wavelength of 360 nanometers (nm).

6. The optical system according to claim 1, wherein an expression $365 \text{ nm} \leq \lambda_{50} \leq 430 \text{ nm}$ is satisfied, where $\lambda_{50}$ represents a wavelength at which transmittance of the reflection portion is 50%.

7. The optical system according to claim 1, wherein an expression $\lambda_{90} - \lambda_{10} \leq 30 \text{ nm}$ is satisfied, in which $\lambda_{10}$ and $\lambda_{90}$ represent wavelengths at which transmittance of the reflection portion is 10% and 90%, respectively.

8. The optical system according to claim 1, wherein the reflection portion has transmittance of no less than 80% within a wavelength range from 480 nm to 660 nm.

9. The optical system according to claim 1, wherein the reflection portion is constituted by a multilayer film that includes $SiO_2$ and $TiO_2$.

10. The optical system according to claim 1, wherein the optical system includes an aperture stop disposed between the reflection portion and the first optical element.

11. The optical system according to claim 1, wherein the optical element made of resin is configured to correct a chromatic aberration at short wavelength area.

12. The optical system according to claim 1, wherein the maximum height H0 is measured from the optical axis to a location on the first optical surface that is furthest point from the optical axis on the first optical surface through which effective light ray passes.

13. The optical system according to claim 1, wherein the maximum height H0 is measured from the optical axis to a location on the first optical surface that is furthest point from the optical axis on the first optical surface through which effective light ray passes.

14. The optical system according to claim 1, wherein the expression $0.10 \leq Lu/L \leq 0.90$ and the expression $|\tan^{-1}(H0/Lr) - \tan^{-1}\{H0(Lr-Lu)/(Ru \times Lr)\}| \leq 25°$ are satisfied both in a case where the second optical surface having the reflection portion is part of a fourth lens from the object side and in a case where the second optical surface having the reflection portion is part of a sixth lens from the object side.

15. The optical system according to claim 1, wherein the expression $0.10 \leq Lu/L \leq 0.90$ and the expression $|\tan^{-1}(H0/Lr) - \tan^{-1}\{H0(Lr-Lu)/(Ru \times Lr)\}| \leq 25°$ are satisfied both in a case where the second optical surface having the reflection portion is part of a fourth lens from the object side and in a case where the second optical surface having the reflection portion is part of a sixth lens from the object side.

16. An optical apparatus comprising:
the optical system according to claim 1; and
a light receiving element configured to receive light from the optical system.

17. An optical system comprising:
a first optical surface located closest to an object side of the optical system;
a first optical element made of resin, located on an image side of the optical system, and configured to move relative to the first optical surface;
a second optical surface position separate from the first optical surface and the first optical element, located between the first optical surface and the first optical element, and configured to move relative to the first optical surface and the first optical element;
a reflection portion provided on the second optical surface and configured to reflect ultraviolet radiation and move with the second optical surface; and
a second optical element made of other than resin and located closest to the image side of the optical system,
wherein, to suppress an increase in size of angles formed by light ray incident on the second optical surface and each surface normal of the second optical surface as a result of a focusing process changing distances between the first optical surface, the first optical element, and the second optical surface, the second optical surface is produce, and disposed in the optical system, according to a process that includes:
setting a reflection portion distance Lu along an optical axis of the optical system as measured from the first optical surface to the reflection portion on the second optical surface to satisfying the expression:

$0.10 \leq Lu/L \leq 0.90$, where L represents a total length of the optical system along the optical axis as measured from the first optical surface to the image side of the second optical element, and setting, based on the set reflection portion distance Lu, a radius of curvature Ru of the second optical surface relative to the reflection portion distance Lu to satisfy the expression:

$|\tan^{-1}(H0/Lr) - \tan^{-1}\{H0(Lr-Lu)/(Ru \times Lr)\}| \leq 25°$, where H0 represents a maximum height of the first optical surface as measured from the optical axis, and Lr represents a distance along the optical axis as measured from the first optical surface to the first optical element.

* * * * *